US 12,470,537 B2

(12) United States Patent
Cohen et al.

(10) Patent No.: US 12,470,537 B2
(45) Date of Patent: Nov. 11, 2025

(54) PERFORMING A SECURITY ACTION WITH REGARD TO AN ACCESS TOKEN BASED ON CLUSTERING OF ACCESS REQUESTS

(71) Applicant: Microsoft Technology Licensing, LLC, Redmond, WA (US)

(72) Inventors: Coral Cohen, Hadera (IL); Andrey Karpovsky, Kiryat Motzkin (IL); Ariel Brukman, Kiriat Ata (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 225 days.

(21) Appl. No.: 18/326,955

(22) Filed: May 31, 2023

(65) Prior Publication Data

US 2024/0406160 A1 Dec. 5, 2024

(51) Int. Cl.
*H04L 9/40* (2022.01)
(52) U.S. Cl.
CPC ........ *H04L 63/0815* (2013.01); *H04L 63/083* (2013.01)
(58) Field of Classification Search
CPC . H04L 63/0815; H04L 63/083; H04L 63/102; H04L 63/1425; H04L 63/20; H04L 63/0807
See application file for complete search history.

(56) References Cited

U.S. PATENT DOCUMENTS

| | | | |
|---|---|---|---|
| 10,860,720 B2 | 12/2020 | Hartnett et al. | |
| 2003/0229623 A1* | 12/2003 | Chang | H04L 63/08 |
| 2016/0267413 A1* | 9/2016 | Liang | G06Q 10/06313 |
| 2019/0007415 A1 | 1/2019 | Kliger et al. | |
| 2021/0084040 A1 | 3/2021 | Sakowicz et al. | |
| 2024/0406207 A1* | 12/2024 | Brukman | H04L 63/104 |

OTHER PUBLICATIONS

International Search Report and Written Opinion received for PCT Application No. PCT/US2024/030165, Sep. 3, 2024, 15 pages.

* cited by examiner

*Primary Examiner* — Baotran N To
(74) *Attorney, Agent, or Firm* — Wade IP Law PLLC

(57) ABSTRACT

Techniques are described herein that are capable of performing a security action with regard to an access token based on clustering of access requests. Subsets of access requests are clustered into respective clusters, which correspond to respective requestor types, based at least on the access requests in the subsets having respective attributes that indicate the respective requestor types. The access requests request access to cloud resources. Access behavior(s) associated with the access requests that are included in respective cluster(s) are identified. A security action is performed with regard to an access token based at least on at least one of the access behavior(s).

20 Claims, 6 Drawing Sheets

PERFORMING A SECURITY ACTION WITH REGARD TO AN ACCESS TOKEN BASED ON CLUSTERING OF ACCESS REQUESTS

BACKGROUND

When a user requests access to a cloud resource, the user may provide an account key or an access token for the purpose of authentication. The user may be authenticated by using the account token or the access token to verify the identity of the user. Authentication of the user enables the user to utilize permissions defined by the account key or the access token. The permissions defined by an account key provide "root" access to an account with which the account key is associated. Accordingly, the account key typically does not allow control usage, which may lead to substantial harm if the account key is compromised. Accordingly, it may not be desirable to use an account key for many business applications.

An access token often provides more flexibility and security than an account key. For instance, an access token can be created on-demand, can provide substantial control to the account owner, can be canceled by revoking a signing key that is used to sign the account token, and can be configured to automatically expire after a specified time. For example, automatic expiration may limit the amount of time that an attacker who intercepts the access token is able to use the access token to perform malicious activities.

However, a disparity may exist between the scope of the permissions that are defined by the access token and the scope that is needed to perform normal access operations using the access token. For instance, the scope of the permissions may be substantially greater or less than the scope that is needed. An account owner may not be aware of potential security issues or access issues stemming from such disparity. The disparity may arise due to insufficient attention to security or difficulty in effectively managing a large number of access keys. The disparity may allow a user to perform operations that the user has no legitimate reason to perform or may prevent the user from performing normal operations. Moreover, a malicious entity may hunt for and misuse an access token having excessively generous permissions.

SUMMARY

It may be desirable to cluster access requests into clusters based on (e.g., based at least on) respective requestor types and to provide a recommendation of permissions to be defined by an access token based on access behaviors associated with one or more of the requestor types. An access request is a request to access a cloud resource. A cloud resource is a resource that is hosted in the cloud. Examples of a resource include but are not limited to a physical device, a file, a folder, and a volume. A requestor type is a type of entity from which an access request is received. Examples of a requestor type include but are not limited to a developer, an end user, a system administrator, and a machine service (e.g., a backend service). An access token is a string that includes a credential, which identifies a cloud resource, and that defines permissions associated with the cloud resource. A string is a sequence (e.g., a variable length sequence) of arbitrary bytes, which may include bytes with value zero (a.k.a. nulls). The string may have a proprietary format. The access token may enable an application to securely call protected web application programming interfaces (APIs) on behalf of a user. For instance, the access request may include (e.g., may be) an API request. The access token may represent authorization of the application to access specific portions of the user's data. The access token may be issued by an authorization server as part of an OAuth 2.0 flow. The access token may attach to an initial process that is created in a user session. The access token may be inherited by a (descendant) process from an ancestor process, such as a child process inheriting the access token from a parent process that creates it.

An access token may be tailored to one or more requestor types. For example, a first access token may have first permissions that are tailored to a first requestor type; a second access token may have second permissions that are tailored to a second requestor type, and so on. In accordance with this example, it may be desirable for developers to have read, write, and delete permissions to containers on which the developers are working; end users to have read access to particular blobs with a relatively short expiration period; system administrators to have read, write, and delete permissions to an entire user account; and backend services to have read and write permissions to internet protocol (IP) addresses of virtual machines that are used (e.g., created) by the backend services. The permissions described with regard to the example requestor types mentioned above are provided for non-limiting, illustrative purposes. It will be recognized that any suitable permissions may be assigned to each requestor type.

In a first example implementation, a determination is made whether permissions defined by an existing access token that is used by the access requests are overly permissive or not permissive enough with regard to a particular requestor type. For example, if the scope of the permissions exceeds the scope of the access behavior associated with the particular requestor type by more than a specified amount, a warning and/or a recommendation to reduce the scope of the permissions may be generated. In another example, if the scope of the access behavior exceeds the scope of the permissions by more than a specified amount, a warning and/or a recommendation to increase the scope of the permissions may be generated.

In a second example implementation, a determination is made as to which permissions are to be defined by a new access token based on the access behavior of at least one of the requestor types. For example, if access behaviors of respective requestor types are different, a recommendation to use different access tokens for the respective requestor types may be provided. In accordance with this example, the permissions for each access token may be established based on the access behavior associated with the respective requestor type.

Various approaches are described herein for, among other things, performing a security action with regard to an access token based on clustering of access requests. In an example approach, subsets of access requests are clustered into respective clusters, which correspond to respective requestor types, based at least on the access requests in the subsets having respective attributes that indicate the respective requestor types. The access requests request access to cloud resources. In a first aspect of this approach, access behaviors that are associated with the access requests in the respective clusters and that correspond to a common access token are identified. In accordance with the first aspect, a determination is made that a difference between a scope of permissions that are defined by the common access token and a scope of a first access behavior, which is associated with a first cluster that corresponds to a first requestor type and which corresponds to the common access token, is greater than or equal to a threshold difference. In further accordance with the first aspect, based at least on the difference between the scope of the permissions that are defined by the common access token and the scope of the first access behavior being greater than or equal to the threshold difference, a security action is performed with regard to the common access token. In a second aspect of this approach, a user-initiated request to create a new access token is received. In accordance with the second aspect, based at least on the user-initiated request, a recommendation that the new access token define designated permissions is provided as a result of the designated permissions having a scope that is based at least on a scope of an identified access behavior associated with the access requests that are included in an identified cluster of the access requests.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
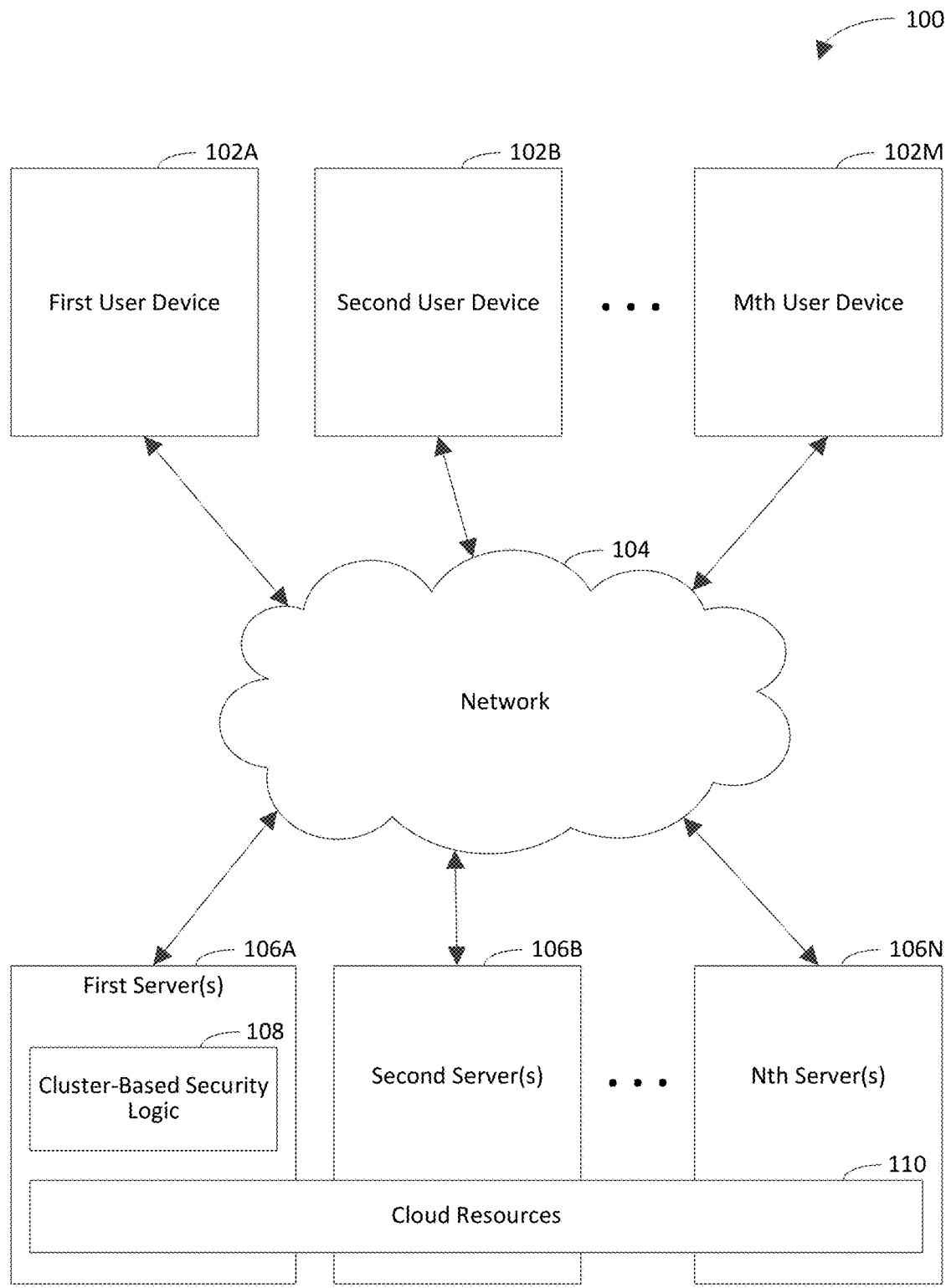
FIG. 1 is a block diagram of an example cluster-based security system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to cluster access requests into clusters based on (e.g., based at least on) respective requestor types and to provide a recommendation of permissions to be defined by an access token based on access behaviors associated with one or more of the requestor types. An access request is a request to access a cloud resource. A cloud resource is a resource that is hosted in the cloud. Examples of a resource include but are not limited to a physical device, a file, a folder, and a volume. A requestor type is a type of entity from which an access request is received. Examples of a requestor type include but are not limited to a developer, an end user, a system administrator, and a machine service (e.g., a backend service). An access token is a string that includes a credential, which identifies a cloud resource, and that defines permissions associated with the cloud resource. A string is a sequence (e.g., a variable length sequence) of arbitrary bytes, which may include bytes with value zero (a.k.a. nulls). The string may have a proprietary format. The access token may enable an application to securely call protected web application programming interfaces (APIs) on behalf of a user. For instance, the access request may include (e.g., may be) an API request. The access token may represent authorization of the application to access specific portions of the user's data. The access token may be issued by an authorization server as part of an OAuth 2.0 flow. The access token may attach to an initial process that is created in a user session. The access token may be inherited by a (descendant) process from an ancestor process, such as a child process inheriting the access token from a parent process that creates it.

An access token may be tailored to one or more requestor types. For example, a first access token may have first permissions that are tailored to a first requestor type; a second access token may have second permissions that are tailored to a second requestor type, and so on. In accordance with this example, it may be desirable for developers to have read, write, and delete permissions to containers on which the developers are working; end users to have read access to particular blobs with a relatively short expiration period; system administrators to have read, write, and delete permissions to an entire user account; and backend services to have read and write permissions to internet protocol (IP) addresses of virtual machines that are used (e.g., created) by the backend services. The permissions described with regard to the example requestor types mentioned above are provided for non-limiting, illustrative purposes. It will be recognized that any suitable permissions may be assigned to each requestor type.

In a first example implementation, a determination is made whether permissions defined by an existing access token that is used by the access requests are overly permissive or not permissive enough with regard to a particular requestor type. For example, if the scope of the permissions exceeds the scope of the access behavior associated with the particular requestor type by more than a specified amount, a warning and/or a recommendation to reduce the scope of the permissions may be generated. In another example, if the scope of the access behavior exceeds the scope of the permissions by more than a specified amount, a warning and/or a recommendation to increase the scope of the permissions may be generated.

In a second example implementation, a determination is made as to which permissions are to be defined by a new access token based on the access behavior of at least one of the requestor types. For example, if access behaviors of respective requestor types are different, a recommendation to use different access tokens for the respective requestor types may be provided. In accordance with this example, the permissions for each access token may be established based on the access behavior associated with the respective requestor type.

Example embodiments described herein are capable of performing a security action with regard to an access token based on clustering of access requests. Example techniques described herein have a variety of benefits as compared to conventional techniques for configuring permissions of an access token. For instance, the example techniques are capable of reducing (e.g., eliminating) a disparity between the scope of the permissions that are defined by the access token and the scope that is needed to perform normal access operations associated with one or more requestor types. A normal access operation associated with a requestor type is an access operation having a likelihood of being performed by an entity of the requestor type that is within a likelihood range corresponding to (e.g., defined by) historical access operations that have been performed by entities of the requestor type. Examples of an access operation include but are not limited to reading a blob by an entity having an IP address that is internal to an organization, writing to a container by an entity having an IP address that is external to the organization, deleting information from a user account by an entity that is not the owner of the user account, and writing information to a virtual machine that is associated with a backend service of an application. The example techniques are capable of guiding a developer with regard to assigning permissions to an existing or new access token, for example, to align the scope of the permissions more closely with the scope of access behaviors associated with one or more requestor types.

The example techniques may increase security of a cloud resource or a computing system that hosts the cloud resource. For instance, by providing a recommendation for a new access token to define particular permissions based on access behavior associated with one or more requestor types, by providing a recommendation to reduce an extent by which a scope of permissions defined by an existing access token exceeds a scope of access behavior associated with one or more requestor types, or by providing a recommendation to utilize multiple access tokens having different sets of permissions for respective requestor types, the example techniques may reduce a likelihood of a malicious entity being able to perform a malicious operation with regard to the cloud resource. For instance, causing the scope of the permissions to be defined or reduced as mentioned above or utilizing multiple access token having sets of permissions with different scopes may prevent the malicious entity from performing an operation that is outside the scope of the access behavior associated with the one or more requestor types. The example techniques may reduce the likelihood of a malicious entity being able to perform a malicious operation with regard to a cloud resource without requiring manual effort and domain expertise by a developer or administrator. The example techniques may be dynamic such that the example techniques are capable of responding to changes in usage and/or configuration of access token(s).

The example techniques may reduce an amount of time and/or resources (e.g., processor cycles, memory, network bandwidth) that is consumed by a computing system to configure permissions of an access token and/or to identify misconfiguration of the permissions. For instance, by providing a recommendation for a new access token to define particular permissions based on access behavior associated with one or more requestor types, by providing a recommendation to reduce an extent by which a scope of permissions defined by an existing access token exceeds a scope of access behavior associated with the one or more requestor types, or by providing a recommendation to utilize multiple access tokens having different sets of permissions for respective requestor types, the example techniques may avoid consumption of time and/or resources that otherwise would have been consumed to identify an appropriate scope of the permissions and/or to address malicious access operations that result from a discrepancy between the scope of the permissions and the scope of the access behavior associated with the one or more requestor types. The example techniques may reduce the amount of time and/or resources consumed to identify misconfigured access tokens (i.e., access tokens having misconfigured permissions) by disregarding access tokens that do not define relatively high-level permissions over relatively long periods of time. For instance, the example techniques may determine whether a security operation is to be performed with regard to an access token only if the access token defines at least a designated number (e.g., 1, 2, or 3) of relatively high-level permission over a relatively long period of time.

By providing a recommendation for a new access token to define particular permissions based on access behavior associated with one or more requestor types, by providing a recommendation to increase a scope of permissions defined by an existing access token to encompass a scope of access behavior associated with the one or more requestor types, or by providing a recommendation to utilize multiple access tokens having different sets of permissions for respective requestor types, the example techniques may avoid consumption of time and/or resources that otherwise would have been consumed to troubleshoot failed access requests to perform normal operations associated with the one or more requestor types.

By reducing the amount of time and/or resources that is consumed by the computing system, the efficiency of the computing system may be increased and/or a cost associated with executing the computer program may be reduced.

A user experience of a developer or information technology (IT) administrator who is tasked with configuring permissions of access tokens may be increased, for example, by recommending a scope of permissions for an access token to the developer or IT administrator. For instance, the recommendation may be triggered by a determination that a new access token is desired, that a difference between a scope of permissions proposed by the developer or IT administrator for the new access token and a scope of access behavior associated with one or more requestor types is greater than a threshold difference, or that a difference between a scope of permissions that are defined by an existing access token and a scope of access behavior associated with one or more requestor types is greater than a threshold difference. Recommending the scope of the permissions for the access token may include recommending the use of multiple access tokens having sets of permissions with different scopes that are aligned with access behaviors of respective requestor types.

A user experience of an end user who requests access to a cloud resource may be increased, for example, by reducing a likelihood that the cloud resource or a computing system that hosts the cloud resource is compromised by a malicious entity using an access token having permissions that are overly permissive.

FIG. 1 is a block diagram of an example cluster-based security system 100 in accordance with an embodiment. Generally speaking, the cluster-based security system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the cluster-based security system 100 performs a security action with regard to an access token based on clustering of access requests. Detail regarding techniques for performing a security action with regard to an access token based on clustering of access requests is provided in the following discussion.

As shown in FIG. 1, the cluster-based security system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes a processing system comprising at least one processor that is capable of manipulating data in accordance with a set of instructions. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the cluster-based security system 100.

One example type of computer program that may be executed by one or more of the servers 106A-106N is a cloud computing program (a.k.a. cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network. The cloud computing program executes at least in part in the cloud. The cloud may be a remote cloud, an on-premises cloud, or a hybrid cloud. It will be recognized that an on-premises cloud may use remote cloud services.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include but are not limited to Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., AppSource® developed and distributed by Microsoft Corporation, Azure® developed and distributed by Microsoft Corporation, GoDaddy® developed and distributed by GoDaddy.com LLC, and Rackspace® developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include cluster-based security logic 108 for illustrative purposes. The cluster-based security logic 108 is configured to perform a security action with regard to an access token based on clustering of access requests. The cluster-based security logic 108 clusters subsets of access requests into respective clusters, which correspond to respective requestor types, based at least on the access requests in the subsets having respective attributes that indicate the respective requestor types. The access requests request access to cloud resources 110. In a first example implementation, the cluster-based security logic 108 identifies access behaviors that are associated with the access requests in the respective clusters and that correspond to a common access token. In accordance with this implementation, the cluster-based security logic 108 determines that a difference between a scope of permissions that are defined by the common access token and a scope of a first access behavior, which is associated with a first cluster that corresponds to a first requestor type and which corresponds to the common access token, is greater than or equal to a threshold difference. In further accordance with this implementation, based at least on the difference between the scope of the permissions that are defined by the common access token and the scope of the first access behavior being greater than or equal to the threshold difference, the cluster-based security logic 108 performs (e.g., automatically performs) a security action with regard to the common access token. In a second example implementation, the cluster-based security logic 108 receives a user-initiated request to create a new access token. In accordance with this implementation, based at least on the user-initiated request, the cluster-based security logic 108 provides (e.g., automatically provides) a recommendation that the new access token define designated permissions as a result of the designated permissions having a scope that is based at least on a scope of an identified access behavior associated with the access requests that are included in an identified cluster of the access requests.

The cloud resources 110 are shown in FIG. 1 to be distributed across the servers 106A-106N for non-limiting, illustrative purposes. It will be recognized that the cloud resources 110 may be hosted by any one or more of the servers 106A-106N.

Security of the cloud resources 110 and computing systems (e.g., any one or more of the servers 106A-106N) on which the cloud resources 110 are hosted may be increased by ensuring that the scope of the permissions that are defined by an access token does not exceed the business needs of each user, groups of users, application, and/or group of applications that may seek to legitimately access the cloud resources 110. By performing a security action (e.g., providing a recommendation of permissions to be defined by the access token) based on (e.g., based at least on) a scope of access behavior associated with access requests that are included in particular cluster(s) and/or that utilize the access token, a likelihood of the permissions aligning with the business needs may be increased.

The cluster-based security logic 108 may use machine learning to perform at least some of its operations. For instance, the cluster-based security logic 108 may use the machine learning to analyze (e.g., develop and/or refine an understanding of) access requests (e.g., attributes thereof, resources identified therein, and types of access requested), clusters of the access requests, access behaviors associated with the clusters, requestor types, access tokens (e.g., permissions defined therein and resources identified therein), relationships between any of the foregoing elements, and confidences in those relationships. For example, the cluster-based security logic 108 may use the machine learning to identify access behaviors associated with one or more requestor types and to determine (e.g., select) permissions to be defined by one or more access tokens.

The cluster-based security logic 108 may use classifiers to perform at least some of its operations. For instance, the cluster-based security logic 108 may label access requests with labels and use the labels to determine permissions that are to be defined by one or more access tokens. For example, each label of an access request may include information indicating an attribute of the access request, a cluster into which the access request is clustered, an access behavior associated with the access request, a requestor type associated with the access request, and/or an access token that is used by the access request. The cluster-based security logic 108 may use the labels to classify (e.g., cluster) the access requests for purposes of identifying access behaviors associated with the clusters and for purposes of determining permissions to be defined by one or more access tokens.

The cluster-based security logic 108 may be implemented in various ways to perform a security action with regard to an access token based on clustering of access requests, including being implemented in hardware, software, firmware, or any combination thereof. For example, the cluster-based security logic 108 may be implemented as computer program code configured to be executed in one or more processors. In another example, at least a portion of the cluster-based security logic 108 may be implemented as hardware logic/electrical circuitry. For instance, at least a portion of the cluster-based security logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the cluster-based security logic 108 may be (or may be included in) a cloud computing program, though the scope of the example embodiments is not limited in this respect.

The cluster-based security logic 108 is shown to be incorporated in the first server(s) 106A for illustrative purposes and is not intended to be limiting. It will be recognized that the cluster-based security logic 108 (or any portion(s) thereof) may be incorporated in any one or more of the servers 106A-106N, any one or more of the user devices 102A-102M, or any combination thereof. For example, client-side aspects of the cluster-based security logic 108 may be incorporated in one or more of the user devices 102A-102M, and server-side aspects of cluster-based security logic 108 may be incorporated in one or more of the servers 106A-106N.

Figure 2:
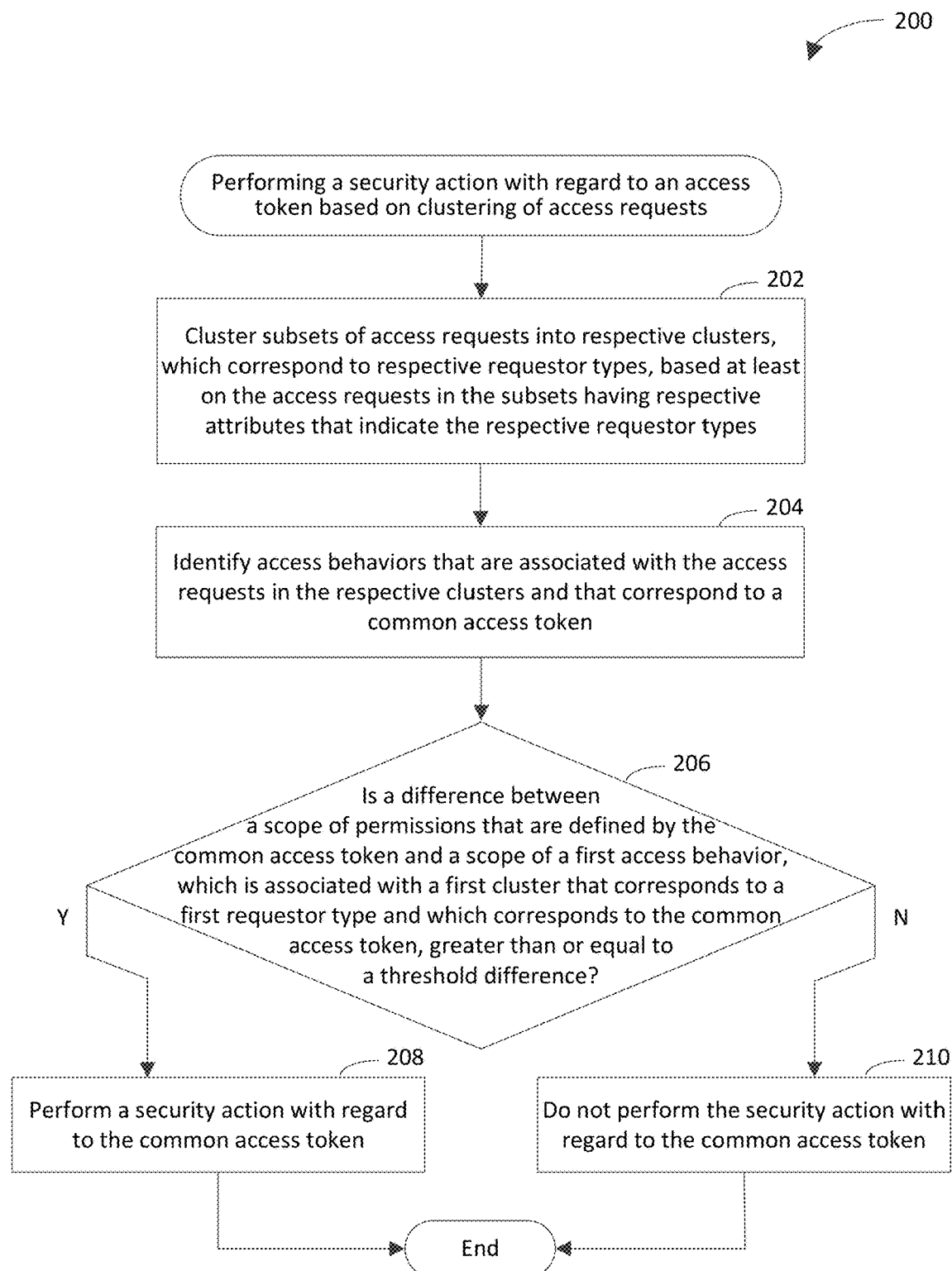
FIGS. 2 and 4 depict flowcharts of example methods for performing a security action with regard to an access token based on clustering of access requests in accordance with embodiments.
Figure 3:
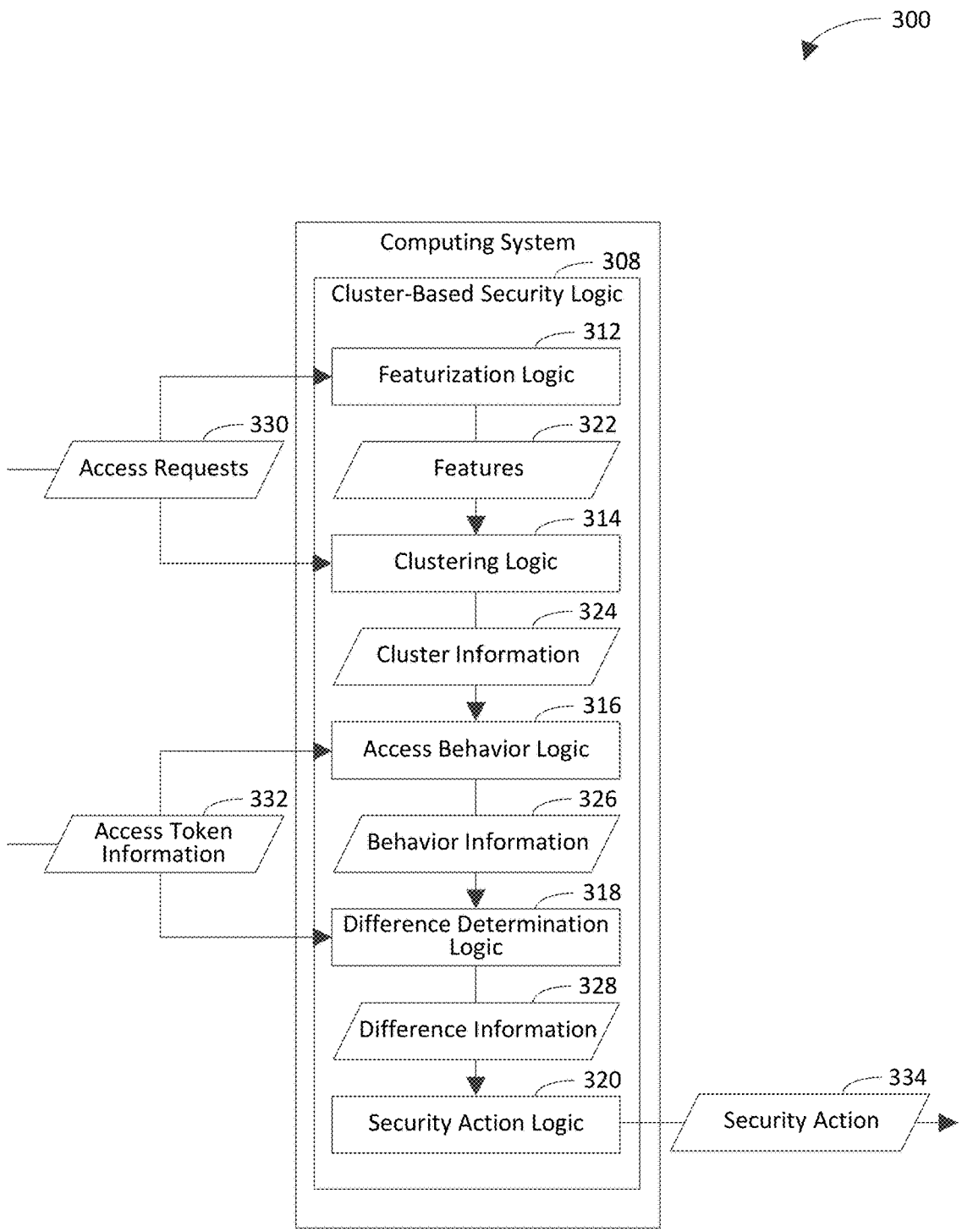
FIGS. 3 and 5 are block diagrams of example computing systems in accordance with embodiments.

FIG. 2 depicts a flowchart 200 of an example method for performing a security action with regard to an access token based on clustering of access requests in accordance with an embodiment. Flowchart 200 may be performed by the first server(s) 106A shown in FIG. 1, for example. For illustrative purposes, flowchart 200 is described with respect to computing system 300 shown in FIG. 3, which is an example implementation of the first server(s) 106A. As shown in FIG. 3, the computing system 300 includes cluster-based security logic 308. The cluster-based security logic 308 includes featurization logic 312, clustering logic 314, access behavior logic 316, difference determination logic 318, and security action logic 320. Further structural and operational embodiments will be apparent to persons skilled in the relevant art(s) based on the discussion regarding flowchart 200.

As shown in FIG. 2, the method of flowchart 200 begins at step 202. In step 202, subsets of access requests are clustered into respective clusters, which correspond to respective requestor types, based at least on the access requests in the subsets having respective attributes that indicate the respective requestor types. The access requests request access to cloud resources. Examples of an attribute include but are not limited to an internet protocol (IP) address of a requestor (e.g., a source) from which an access request is received, a referrer that refers the access request, a user-agent that provides the access request on behalf of the requestor, a type of authentication used by the access request, an authentication key that is used by the access request, a target (e.g., storage account, container, or bucket) of the access request, a timestamp indicating a time instance at which the access request is generated, and a success status of the access request. The success status indicates whether receipt of the access request, which requests access to a cloud resource, resulted in access to the cloud resource being granted. For instance, the success status may indicate a successful access or a failed attempt to access. The success status may indicate whether a further authentication was required (e.g., a redirect to authentication service). For example, an attempt to access a cloud resource that does not exist (e.g., has been deleted or never existed) will result in a failed attempt to access the cloud resource. The success status may include (e.g., be) a hypertext transfer protocol (HTTP) status, though the scope of the example embodiments is not limited in this respect.

In an aspect, clustering the subsets of the access requests at step 202 includes balancing multiple criteria, such as cluster size, cluster content, and a number of required attributes. For example, a relatively larger cluster size may be preferable. In another example, homogeneity of inliers may be preferable. In yet another example, a relatively lower number of required attributes may be preferable. For some example clustering techniques (e.g., hierarchical clustering), a number of clusters that are utilized to cluster the subsets of the access requests at step 202 may be selected (e.g., optimized) based on the multiple criteria. In another aspect, a predefined number of clusters may be utilized to cluster the subsets of the access requests at step 202.

In an example implementation, the clustering logic 314 clusters subsets of access requests 330 into the respective clusters based at least on the access requests 330 in the subsets having respective attributes that indicate the respective requestor types. For example, the clustering logic 314 may cluster a first subset of the access requests 330 into a first cluster based on the access requests 330 that are included in the first subset having a first attribute that indicates a first requestor type; the clustering logic 314 may cluster a second subset of the access requests 330 into a second cluster based on the access requests 330 that are included in the second subset having a second attribute that indicates a second requestor type, and so on. Each of the access requests 330 requests access to a cloud resource. The clustering logic 314 generates cluster information 324 to identify each of the clusters and to indicate (e.g., specify) which of the access requests 330 are clustered into each cluster.

In an example embodiment, the subsets of the access requests are clustered into the respective clusters at step 202 using sampling. Sampling is a technique of selecting individual members or a subset of a population to make statistical inferences from them and estimate the characteristics of an entirety of the population. Examples of sampling include but are not limited to probability sampling and non-probability sampling.

Probability sampling is a sampling technique in which one or more criteria are selected, and members of a population are randomly selected using the one or more criteria to create a sample. All members of the population that satisfy the one or more criteria have an equal opportunity to be included in the sample. Examples of probability sampling include but are not limited to simple random sampling, stratified sampling, cluster sampling, and systematic clustering.

In simple random sampling, every element has an equal chance of being selected for inclusion in the sample. Simple random sampling may be used when no prior information about the population is available.

In stratified sampling, the elements of the population are divided into subgroups (a.k.a. strata) based on similarity such that the elements are heterogeneous within the group and are homogeneous within each subgroup. After the elements are divided in this manner, elements are randomly selected from each of the strata. Prior information about the population is used to create the subgroups.

In cluster sampling, the population (e.g., an entirety of the population) is divided into clusters (a.k.a. sections), and clusters are randomly selected. All the elements of a cluster are used for sampling. The clusters may be identified using attributes such as age, sex, and location.

In systematic clustering, the selection of elements is systematic and not random, except for the first element. Elements of a sample are chosen at regular intervals of population. The elements are combined in a sequence in which each element has an equal chance of being selected.

Non-probability sampling is a sampling technique in which members are chosen at random. Non-probability sampling is not a fixed or predefined selection technique, which may cause difficulty for all elements of a population to have equal opportunities to be included in a sample.

When using K-means clustering, elbow plots may be used to select the number of clusters. To produce an elbow plot, a K-means algorithm may be run iteratively, first with K=1, then K=2, and so on, and the variation within clusters at each value of K may be computed. Variation may be calculated by summing squared distances from each point to the center of the cluster. Using K-means with only one cluster results in a relatively high variance within the cluster, whereas using K-means with multiple clusters that each include a single point results in a variance of zero. Increasing K and increasing cluster numbers leads to a decrease in the total variation within clusters. The elbow method aims to identify the point of inflection (i.e., the "elbow") on the curve. After the point of inflection, adding additional clusters does not minimize the variance within a cluster sufficiently to justify the additional clusters.

In an example embodiment, clustering the subsets of the access requests into the respective clusters at step 202 is based at least on the access requests in the subsets being initiated by sources having IP addresses in respective ranges of IP addresses that indicate the respective requestor types. For instance, a first subset of the access requests may be clustered into a first cluster based at least on the access requests in the first subset being initiated by sources having IP addresses in a first IP address range associated with a first requestor type; a second subset of the access requests may be clustered into a second cluster based at least on the access requests in the second subset being initiated by sources having IP addresses in a second IP address range associated with a second requestor type, and so on.

In another example embodiment, clustering the subsets of the access requests into the respective clusters at step 202 is based at least on the subsets of the access requests having respective referrer attributes that indicate respective intermediate entities that correspond to the respective requestor types. For instance, a first subset of the access requests may be clustered into a first cluster based at least on the access requests in the first subset having a first referrer attribute that indicates a first intermediate entity that corresponds to a first requestor type; a second subset of the access requests may be clustered into a second cluster based at least on the access requests in the second subset having a second referrer attribute that indicates a second intermediate entity that corresponds to a second requestor type, and so on. An intermediate entity is an entity that is between a source that initiates an access request and a target to which the access request is directed.

In yet another example embodiment, clustering the subsets of the access requests into the respective clusters at step 202 is based at least on the access requests in the subsets being received from user-agents that indicate the respective requestor types. For instance, a first subset of the access requests may be clustered into a first cluster based at least on the access requests in the first subset being received from user-agents corresponding to a first requestor type; a second subset of the access requests may be clustered into a second cluster based at least on the access requests in the second subset being received from user-agents corresponding to a second requestor type, and so on. A user-agent from which an access request is received is an entity that provides the access request on behalf of a user (i.e., human). Examples of a user-agent include but are not limited to a web browser, a specific version of a web browser, and web crawler. A web crawler is an Internet bot that systematically browses the Word Wide Web (WWW).

At step 204, access behaviors that are associated with the access requests in the respective clusters and that correspond to a common access token are identified. In an aspect, the common access token is not user specific, meaning that the common access token is not specific to a particular user. For example, the common access token may be private access token (PAT). A PAT is a token that includes a credential that proves that an access request that uses the PAT is received from a legitimate device without disclosing an identity of a user (e.g., the user who initiated the access request). In another example, the common access token may be a shared access signature (SAS). A SAS is a signed URI that points to one or more cloud resources. The URI includes a token that includes query parameters. The query parameters include a signature with which the URI is signed. In an aspect, the SAS is created using an account or user key. In accordance with this example, the account or user key may be used to sign the URI. For instance, using the account or user key to sign the URI enables a user to share the SAS with other users and applications, which may enable the other users and applications to access an account (e.g., storage account) of the user without providing an account key associated with the account.

An example SAS may be defined as follows: "sv=22015-06-07@sr=b@sig=39Up9JxHkxUhFEjEH9594DJxe7w6cIRCgOV6ICGSo%3D&se=2016-09-17T21%3A51%3A37Z&sp=rcw". This SAS may include all the information needed for a storage account to grant access to a specific resource. For instance, the SAS may be parsed to identify the following fields: signature (labeled as "sig"), signed expiry (labeled as "se"), signed resources (labeled as "sr"), and signed permissions (labeled as "sp"). The signature in this example is a hash of an individual unique key signature, which can be used as a key identifier (ID). The signature field is represented as "sig=39Up9JxHkxUhFEjEH9594DJxe7w6cIRCgOV6ICGSo%3D&". The signed expiry has a value that defines a time at which the SAS becomes invalid (e.g., non-functional). The signed expiry field is represented as "se=2016-09-17T21", meaning that the SAS becomes invalid at 21:00 (i.e., 9:00 pm) on Sep. 17, 2016. The signed resources are the resources to which the SAS grants access. The signed resources field is represented as "sr=b", indicating that the SAS grants access to content and metadata of the blob, which is represented as "b" in the signed resources field. The signed permissions are the permissions that are granted by the SAS. The signed permissions field is represented as "sp-rcw", indicating that the SAS grants read (labeled as "r"), create (labeled as "c"), and write (labeled as "w") permissions. The read ("r") permission enables the resource to be read. The create ("c") permission enables creation of the resource. The write ("w") permission enables content and metadata of the resource to be written. Some other examples of a permission that may be granted by the SAS include but are not limited to a delete ("d") permission and a list ("l") permission. The delete ("d") permission enables deletion of the resource. The list ("l") permission enables objects to be listed within the resource.

In an example implementation, the access behavior logic 316 identifies access behaviors that are associated with the access requests 330 in the respective clusters and that correspond to the common access token. For example, the access behavior logic 316 may analyze access token information 332 to identify the common access token. The access behavior logic 316 may cross reference the common access token, as indicated by the access token information 332, with the access requests 330 that are included in each cluster, as indicated by the cluster information 324, to determine qualifying access requests in the respective cluster. A qualifying access request in a cluster is an access request that is included in the cluster and that uses the common access token to request access to a cloud resource. It may be said that the access behavior logic 316 filters the access requests 330 that are included in each cluster by using the common access token (e.g., an identifier associated with the common access token) to identify the qualifying access requests in the respective cluster. In accordance with this implementation, the access behavior logic 316 analyzes the qualifying access requests in each cluster to determine the access behavior associated with those qualifying access requests. For example, the access behavior logic 316 may determine which access actions were requested by (or performed based on) the qualifying access requests in each cluster, a frequency with which each access action was requested by (or performed based on) the qualifying access requests in each cluster over a specified period of time, and/or a likelihood that each access action is to be requested by (or performed based on) an access request corresponding to each requestor type using the common access token. The access behavior logic 316 generates behavior information 326 to indicate the access behaviors that are associated with the access requests 330 in the respective clusters and that correspond to the common access token. Accordingly, the behavior information 326 may indicate the clusters and the qualifying access tokens in each cluster.

In an example embodiment, identifying the access behaviors is performed at step 204 by analyzing a data plane log that describes accesses of end users to a cloud resource that use the common access token. In an aspect, a data plane log includes information about packets that are processed by a data plane. A data plane is a component of a router that examines an incoming packet and forwards the incoming packet to a target destination in a network. Examples of a data plane include but are not limited to an Ethernet network, a Wi-Fi network, a cellular network, and a satellite network. In an example, the data plane log may include names of files that are uploaded to a server, sizes of the files, IP addresses from which the files are uploaded, and so on.

In another example embodiment, identifying the access behaviors is performed at step 204 by analyzing a token management service log that describes administrative operations that are performed using the common access token. An administrative operation is an operation that defines how information is to be managed, routed, and/or processed. For instance, the administrative operation may be performed by a service or an administrator. An example of an administrative operation is the creation of an access token (e.g., to be used by access requests). The token management service log includes information generated and/or stored by a token management service. A token management service is a service that manages tokens (e.g., access tokens).

At step 206, a determination is made whether a difference between a scope of permissions that are defined by the common access token and a scope of a first access behavior, which is associated with a first cluster that corresponds to a first requestor type and which corresponds to the common access token, is greater than or equal to a threshold difference. In an aspect, the scope of the permissions is compared to the scope of the first access behavior to make the determination. In another aspect, the permissions are indicated by an identifier associated with the common access token. For example, the permissions may be specified in a hash that identifies the common access token. In another example, the identifier may be a uniform resource identifier (URI), such as a uniform resource name (URN) or a uniform resource locator (URL). If the difference is greater than or equal to the threshold difference, flow continues to step 208. Otherwise, flow continues to step 210. In an example implementation, the difference determination logic 318 determines whether the difference between the scope of the permissions, as indicated by the access token information 332, and the scope of the first access behavior, as indicated by the behavior information 326, is greater than or equal to the threshold difference. The difference determination logic 318 generates difference information 328 to indicate whether the difference between the scope of the permissions and the scope of the first access behavior is greater than or equal to the threshold difference. For instance, the difference determination logic 318 may configure the difference information 328 to have a first value to indicate that the difference is greater than or equal to the threshold difference or a second value to indicate that the difference is less than the threshold difference.

In an example embodiment, the determination at step 206 includes determining whether the difference between the scope of permissions that are defined by the common access token and the scope of the first access behavior is greater than the threshold difference. For instance, the threshold difference may be zero. In accordance with this embodiment, if the difference is greater than the threshold difference, flow continues to step 208; otherwise, flow continues to step 210.

In another example embodiment, the determination at step 206 includes determining whether the difference between a first value, which represents the scope of the permissions that are defined by the common access token, (e.g., an inversion of the scope of the permissions) and a second value, which represents the scope of the first access behavior. (e.g., an inversion of the scope of the first access behavior) is less than or equal to the threshold difference. In accordance with this embodiment, if the difference is less than or equal to the threshold difference, flow continues to step 208; otherwise, flow continues to step 210.

In yet another example embodiment, the determination at step 206 includes determining whether the difference between a first value, which represents the scope of the permissions that are defined by the common access token, (e.g., an inversion of the scope of the permissions) and a second value, which represents the scope of the first access behavior, (e.g., an inversion of the scope of the first access behavior) is less than the threshold difference. In accordance with this embodiment, if the difference is less than the threshold difference, flow continues to step 208; otherwise, flow continues to step 210.

In an example embodiment, the first access behavior indicates predicted likelihoods of respective actions to be performed with regard to an arbitrary access request that corresponds to the first requestor type and that uses the common access token. In accordance with this embodiment, the difference between the scope of the permissions that are defined by the common access token and the scope of the first access behavior takes into consideration the predicted likelihoods of the respective actions to be performed with regard to the arbitrary access request.

In an example implementation of this embodiment, the first access behavior indicates a first predicted likelihood of 55% that a read operation is to be performed on a cloud resource that is indicated by the arbitrary access request, a likelihood of 35% that a write operation is to be performed on the cloud resource that is indicated by the arbitrary access request, and a likelihood of 10% that a delete operation is to be performed on the cloud resource that is indicated by the arbitrary access request. The scope of the access behavior may be represented using a vector $0.55r+0.35w+0.10d$, where r represents the read operation; w represents the write operation; and d represents the delete operation. In accordance with this implementation, the permissions that are defined by the common access token enable reading and writing the cloud resource and prohibit deleting the cloud resource. Because the permissions enable reading and writing the cloud resource, the scope of the first access behavior may include a value of 1.00 associated with each of the read operation and the write operation. Because the permissions prohibit deleting the cloud resource, the scope of the first access behavior may include a value of 0.00 associated with the delete operation. The scope of the permissions that are defined by the common access token may be represented using a vector $1.00r+1.00w+0.00d=1.00r+1.00w$, where r represents the read operation; w represents the write operation; and d represents the delete operation. In an aspect of this implementation, the difference between the scope of the permissions that are defined by the common access token and the scope of the first access behavior is represented as $(1.00r+1.00w)-(0.55r+0.35w+0.10d)=0.45r+0.65w-0.10d$, which may be represented in scalar form as $0.45+0.65-0.10=1.0$. In another aspect of this implementation, the difference between the scope of the permissions that are defined by the common access token and the scope of the first access behavior is $[(1.00r-0.55r)^2+(1.00w-0.35w)^2+(0.00d-0.10d)^2]^{(1/2)}=[(0.45r)^2+(0.65w)^2+(-0.10d)^2]^{(1/2)}$, which may be represented in scalar form as $[(0.45)^2+(0.65)^2+(-0.10)^2]^{(1/2)}=(0.2025+0.4225+0.0100)^{(1/2)}=0.635^{(1/2)}=0.80$.

At step 208, a security action is performed with regard to the common access token. In an example implementation, the security action logic 320 performs a security action 334 with regard to the common access token based on the difference information 328 indicating that the difference is greater than or equal to the threshold difference (e.g., based on the difference information 328 having the first value). Upon completion of step 208, flowchart 200 ends.

In an example embodiment, performing the security action at step 208 includes generating a security alert, which indicates the difference between the scope of the permissions that are defined by the common access token and the scope of the first access behavior. For instance, the security alert may specify the threshold difference and/or an amount by which the difference between the scope of the permissions that are defined by the common access token and the scope of the first access behavior exceeds the threshold difference.

At step 210, the security action is not performed with regard to the common access token. In an example implementation, the security action logic 320 does not perform the security action 334 with regard to the common access token based on the difference information 328 indicating that the difference is less than the threshold difference (e.g., based on the difference information 328 having the second value). Upon completion of step 210, flowchart 200 ends.

In an example embodiment, determining that the difference between the scope of the permissions that are defined by the common access token and the scope of the first access behavior is greater than or equal to the threshold difference at step 206 includes determining that an amount by which the scope of the permissions that are defined by the common access token exceeds the scope of the first access behavior, which is associated with the first cluster and which corresponds to the common access token, is greater than or equal to the threshold difference. In accordance with this embodiment, performing the security action at step 208 includes providing a recommendation to reduce the scope of the permissions that are defined by the common access token. For instance, the recommendation to reduce the scope of the permissions that are defined by the common access token may be provided based at least on the amount by which the scope of the permissions that are defined by the common access token exceeds the scope of the first access behavior being greater than or equal to the threshold difference.

In another example embodiment, determining that the difference between the scope of the permissions that are defined by the common access token and the scope of the first access behavior is greater than or equal to the threshold difference at step 206 includes determining that an amount by which the scope of the first access behavior, which is associated with the first cluster and which corresponds to the common access token, exceeds the scope of the permissions that are defined by the common access token is greater than or equal to the threshold difference. In accordance with this embodiment, performing the security action at step 208 includes providing a recommendation to increase the scope of the permissions that are defined by the common access token. For instance, the recommendation to increase the scope of the permissions that are defined by the common access token may be provided based at least on the amount by which the scope of the first access behavior exceeds the scope of the permissions that are defined by the common access token being greater than or equal to the threshold difference. For example, the recommendation may recommend increasing the scope of the permissions to an extent that enables the first access behavior to be performed. In another example, the recommendation may recommend increasing the scope of the permissions by an amount that corresponds to (e.g., is defined by) the amount by which the scope of the first access behavior exceeds the scope of the permissions.

In an example implementation of this embodiment, the first requestor type is a developer; the scope of the first access behavior includes delete operations with regard to containers; the permissions do not enable performance of a delete operation with regard to a container; and the recommendation recommends configuring the common access token to define a permission that enables performance of a delete operation with regard to a container on which the developer is working.

In another example implementation of this embodiment, the first requestor type is an end user; the scope of the first access behavior includes read operations; the permissions do not enable performance of a read operation; and the recommendation recommends configuring the common access token to define a permission that enables performance of a read operation.

In yet another example implementation of this embodiment, the first requestor type is a system administrator; the scope of the first access behavior includes deletions of user accounts; the permissions do not enable deletion of a user account; and the recommendation recommends configuring the common access token to define a permission that enables a deletion of a user account.

In yet another example embodiment, determining that the difference between the scope of the permissions that are defined by the common access token and the scope of the first access behavior is greater than or equal to the threshold difference at step 206 includes determining that an amount by which the scope of the first access behavior, which is associated with the first cluster and which corresponds to the common access token, exceeds the scope of the permissions that are defined by the common access token is greater than or equal to the threshold difference. In accordance with this embodiment, performing the security action at step 208 includes providing a recommendation to replace the common access token with multiple access tokens that define respective sets of permissions that have respective different scopes. For instance, the recommendation to replace the common access token with multiple access tokens that define respective sets of permissions that have respective different scopes may be provided based at least on the amount by which the scope of the first access behavior exceeds the scope of the permissions that are defined by the common access token being greater than or equal to the threshold difference.

In some example embodiments, one or more steps 202, 204, 206, 208, and/or 210 of flowchart 200 may not be performed. Moreover, steps in addition to or in lieu of steps 202, 204, 206, 208, and/or 210 may be performed. For instance, in an example embodiment, the method of flowchart 200 further includes determining access actions, which are triggered by the access requests, by monitoring the access requests over a period of time. For example, the featurization logic 312 may determine the access actions, which are triggered by the access requests 330, by monitoring the access requests 330 over the period of time. The featurization logic 312 may define features that represent the access actions and include those features in features 322. In accordance with this embodiment, identifying the access behaviors at step 204 includes analyzing at least a subset of the access actions that are triggered by the access requests. In further accordance with this embodiment, the subset of the access actions corresponds to the common access token.

In another example embodiment, the method of flowchart 200 further includes featurizing the attributes of the access requests in the subsets to provide features, which are numerical representations of the attributes. For example, featurizing the attributes may include converting data (e.g., text data, graph data, or time-series data) associated with the attributes into a numerical vector (e.g., a compressed spatial index). Featurizing the attributes may utilize K-means featurization to create a compressed spatial index of the data, which can be fed into a model. Featurizing the attributes may utilize dimension reduction technique(s) (e.g., principal component analysis) and/or other clustering techniques (e.g., an elliptic envelope technique). In another example, the attributes may be featurized using bit arrays. In yet another example, the attributes may be featurized using categorical variables. In an example implementation, the featurization logic 312 featurizes the attributes of the access requests 330 in the subsets to provide the features 322, which are numerical representations of the attributes. In accordance with this embodiment, the subsets of the access requests are clustered into the respective clusters at step 202 based at least on the features. For instance, the subsets of the access requests may be clustered into the respective clusters at step 202 based at least on relationships between the features. In an example implementation, the clustering logic 314 clusters the subsets of the access requests 330 into the respective clusters based at least on the features 322.

In an aspect of this embodiment, featurizing the attributes of the access requests in the subsets includes assigning a numeric or textual value to each attribute to provide a respective feature. The subsets of the access requests may be clustered based on the numeric or textual values assigned to the access requests in each cluster being within a range of numeric or textual values. In accordance with this aspect, numerical or textual values are assigned to the permissions that are defined by the common access token. In further accordance with this aspect, the numerical or textual values that are assigned to the attributes of the access requests in the first cluster are compared to the numerical or textual values that are assigned to the permissions that are defined by the common access token to determine the difference between the scope of the permissions and the scope of the access behavior. The difference may be represented using a single numerical or textual difference value (e.g., by combining the differences between the numeric or textual value of each attribute and the corresponding permission) or using a vector of numeric or textual difference values (e.g., such that each numeric or textual difference value in the vector corresponds to a difference between the numeric or textual value of the respective attribute and the respective corresponding permission). The difference between textual values may be represented by a first difference value (e.g., "1") if the textual values are the same, whereas the difference may be represented by a second difference value (e.g., "0") if the textual values are not the same. The threshold difference may be represented using a single threshold value or a vector of threshold values (e.g., corresponding to the respective attributes). A determination may be made at step 206 that the difference between the scope of the permissions and the scope of the first access behavior is less than the threshold difference based on (1) the permissions including only minimum permissions for the first requestor type; (2) the permissions including the minimum permissions and a permission to query existence of a cloud resource (e.g., a file); (3) the permissions including the minimum permissions and a permission to read metadata associated with a cloud resource; (4) the permissions including the minimum permissions and a permission to create a cloud resource if the cloud resource does not already exist; (5) the permissions including the minimum permissions and a permission to write data to a cloud resource; or any combination of (2)-(5).

In an example of this aspect, the differences between the numeric or textual values of the attribute and their corresponding permissions are weighted. For instance, weights may be assigned to respective variables (e.g., attributes and/or permissions) based on their importance in a security context. For example, an administrator permission may be more important than an external usage.

In another example of this aspect, correlation between variables may be used to determine whether difference between the scope of the permissions and the scope of the first access behavior is greater than or equal to the threshold difference at step 206. For instance, a delete privilege may be interesting only if an access request is received from an IP address that is within a low-reputation range of external IP addresses.

It will be recognized that the computing system 300 may not include one or more of the cluster-based security logic 308, the featurization logic 312, the clustering logic 314, the access behavior logic 316, the difference determination logic 318, and/or the security action logic 320. Furthermore, the computing system 300 may include components in addition to or in lieu of the cluster-based security logic 308, the featurization logic 312, the clustering logic 314, the access behavior logic 316, the difference determination logic 318, and/or the security action logic 320.

Figure 4:
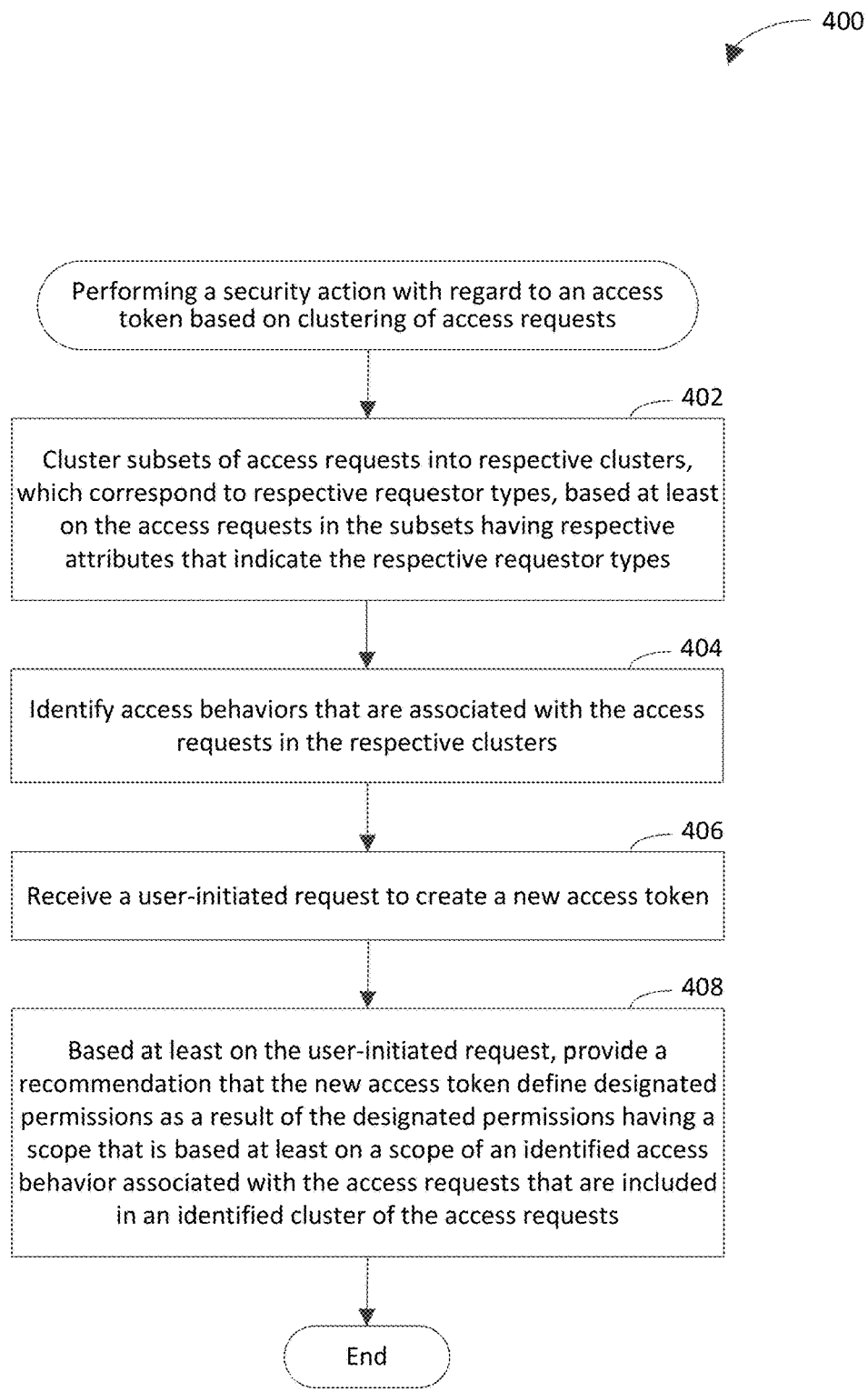
Figure 5:
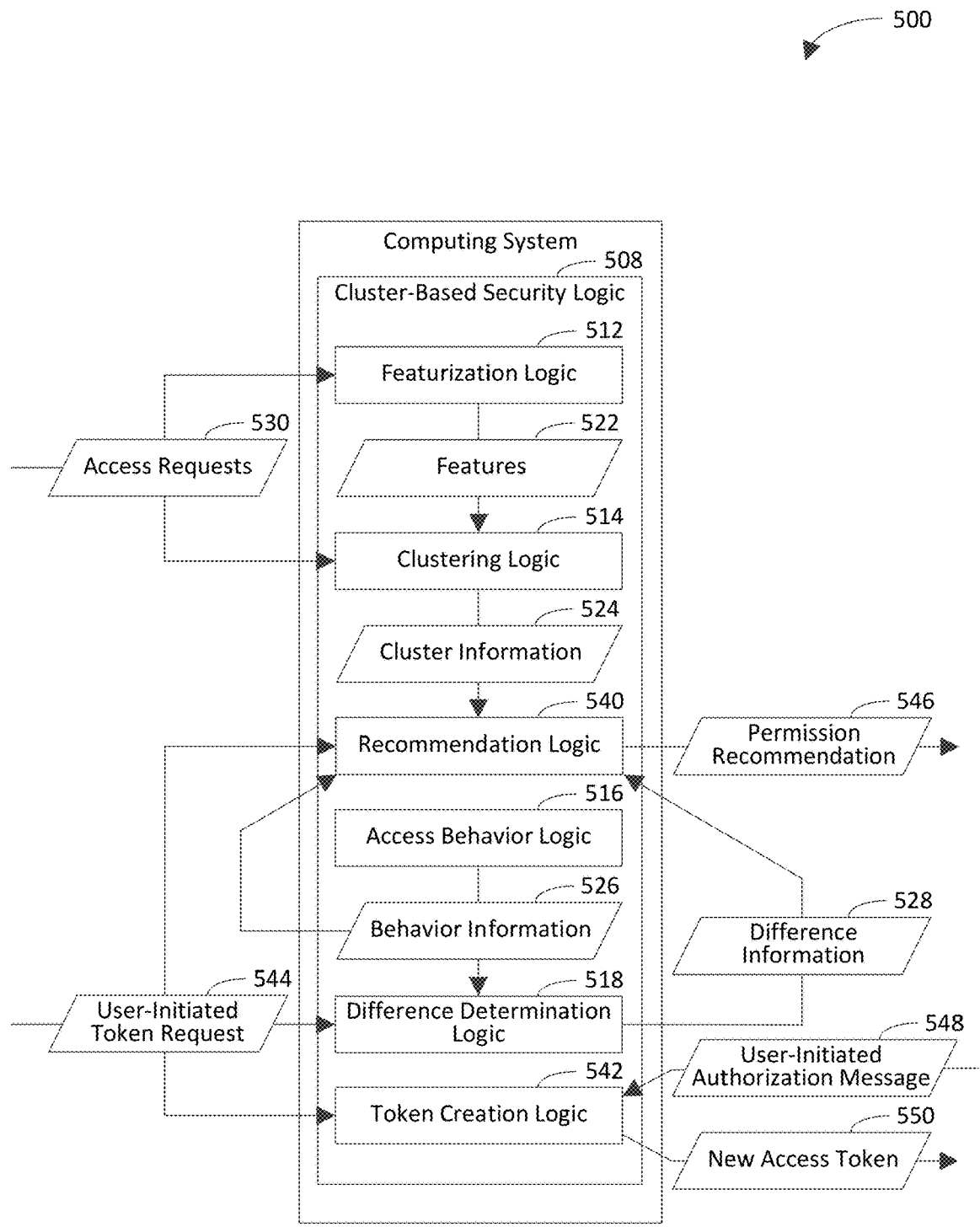

FIG. 4 depicts a flowchart 400 of another example method for performing a security action with regard to an access token based on clustering of access requests in accordance with an embodiment. Flowchart 400 may be performed by the first server(s) 106A shown in FIG. 1, for example. For illustrative purposes, flowchart 400 is described with respect to computing system 500 shown in FIG. 5, which is another example implementation of the first server(s) 106A. As shown in FIG. 5, the computing system 500 includes cluster-based security logic 508. The cluster-based security logic 508 includes featurization logic 512, clustering logic 514, access behavior logic 516, difference determination logic 518, recommendation logic 540, and token creation logic 542. Further structural and operational embodiments will be apparent to persons skilled in the relevant art(s) based on the discussion regarding flowchart 400.

As shown in FIG. 4, the method of flowchart 400 begins at step 402. In step 402, subsets of access requests are clustered into respective clusters, which correspond to respective requestor types, based at least on the access requests in the subsets having respective attributes that indicate the respective requestor types. The access requests request access to cloud resources. Some examples of an attribute are described above with reference to step 202 of FIG. 2. In an example implementation, the clustering logic 514 clusters subsets of access requests 530 into respective clusters, which correspond to respective requestor types, based at least on the access requests 530 in the subsets having respective attributes that indicate the respective requestor types. For example, the clustering logic 514 may cluster a first subset of the access requests 330 into a first cluster based on the access requests 530 that are included in the first subset having a first attribute that indicates a first requestor type; the clustering logic 514 may cluster a second subset of the access requests 530 into a second cluster based on the access requests 530 that are included in the second subset having a second attribute that indicates a second requestor type, and so on. Each of the access requests 530 requests access to a cloud resource. The clustering logic 514 generates cluster information 524 to identify each of the clusters and to indicate (e.g., specify) which of the access requests 530 are clustered into each cluster.

In an example embodiment, the subsets of the access requests are clustered into the respective clusters at step 402 based at least on the access requests in the subsets being initiated by sources having IP addresses in respective ranges of IP addresses that indicate the respective requestor types. For instance, a first subset of the access requests may be clustered into a first cluster based at least on the access requests in the first subset being initiated by sources having IP addresses in a first IP address range, which indicates a first requestor type; a second subset of the access requests may be clustered into a second cluster based at least on the access requests in the second subset being initiated by sources having IP addresses in a second IP address range, which indicates a second requestor type, and so on.

In another example embodiment, the subsets of the access requests are clustered into the respective clusters at step 402 based at least on the subsets of the access requests having respective referrer attributes that indicate respective intermediate entities that correspond to the respective requestor types. For instance, a first subset of the access requests may be clustered into a first cluster based at least on the access requests in the first subset having a first referrer attribute that indicates a first intermediate entity that corresponds to a first requestor type; a second subset of the access requests may be clustered into a second cluster based at least on the access requests in the second subset having a second referrer attribute that indicates a second intermediate entity that corresponds to a second requestor type, and so on. An intermediate entity is an entity that is between a source that initiates an access request and a target to which the access request is directed.

In yet another example embodiment, the subsets of the access requests are clustered into the respective clusters at step 402 based at least on the access requests in the subsets being received from user-agents that indicate the respective requestor types. For instance, a first subset of the access requests may be clustered into a first cluster based at least on the access requests in the first subset being received from a first subset of the user-agents, which indicates a first requestor type; a second subset of the access requests may be clustered into a second cluster based at least on the access requests in the second subset being received from a second subset of the user-agents, which indicates a second requestor type, and so on. A user-agent from which an access request is received is an entity that provides the access request on behalf of a user (i.e., human). Examples of a user-agent include but are not limited to a web browser, a specific version of a web browser, and web crawler. A web crawler is an Internet bot that systematically browses the Word Wide Web (WWW).

At step 404, access behaviors that are associated with the access requests in the respective clusters are identified. In an example implementation, the access behavior logic 516 identifies access behaviors that are associated with the access requests 530 in the respective clusters. In accordance with this implementation, the access behavior logic 516 analyzes the access requests 530 in each cluster to determine the access behavior associated with those access requests. For example, the access behavior logic 516 may determine which access actions were requested by (or performed based on) the access requests 530 in each cluster, a frequency with which each access action was requested by (or performed based on) the access requests 530 in each cluster over a specified period of time, and/or a likelihood that each access action is to be requested by (or performed based on) an access request corresponding to each requestor type. The access behavior logic 516 generates behavior information 526 to indicate the access behaviors that are associated with the access requests 530 in the respective clusters. Accordingly, the behavior information 526 may indicate the clusters and which of the access tokens 530 are included in each cluster.

At step 406, a user-initiated request to create a new access token is received. For instance, the user-initiated request may request creation of a new shared access signature (SAS) or a new private access token (PAT). In an example implementation, the recommendation logic 540 receives a user-initiated token request 544, which requests creation of a new access token 550.

At step 408, based at least on the user-initiated request, a recommendation that the new access token define designated permissions is provided as a result of the designated permissions having a scope that is based at least on a scope of an identified access behavior associated with the access requests that are included in an identified cluster of the access requests. In an example implementation, based at least on the user-initiated token request 544, the recommendation logic 540 provides a permission recommendation 546, which recommends that the new access token 550 define designated permissions as a result of the designated permissions having a scope that is based at least on a scope of an identified access behavior associated with the access requests that are included in an identified cluster of the access requests. For example, the recommendation logic 540 may analyze the behavior information 526 to determine the scope of the identified access behavior, which is associated with the access requests that are included in the identified cluster of the access requests 530. In accordance with this example, the recommendation logic 540 selects the designated permissions from a corpus of possible permissions such that the scope of the designated permissions encompasses the scope of the identified access behavior. In accordance with this example, the recommendation logic 540 may select the designated permissions from the corpus of possible permissions such that the scope of the designated permissions exceeds the scope of the identified access behavior by an amount that is less than a threshold amount.

In some example embodiments, one or more steps 402, 404, 406, and/or 408 of flowchart 400 may not be performed. Moreover, steps in addition to or in lieu of steps 402, 404, 406, and/or 408 may be performed. For instance, in an example embodiment, the user-initiated request requests that the new access token define selected permissions. In accordance with this embodiment, the method of flowchart 400 further includes determining that a difference between a scope of the selected permissions and the scope of the identified access behavior associated with the access requests that are included in the identified cluster exceeds a threshold difference. In an example implementation, the difference determination logic 518 determines that a difference between a scope of the selected permissions and the scope of the identified access behavior, which is associated with the access requests 530 that are included in the identified cluster, exceeds the threshold difference. For example, the difference determination logic 518 analyzes the user-initiated token request 544 to determine the selected permissions. In accordance with this example, the difference logic 518 analyzes the behavior information 526 to determine the identified access behavior associated with the access requests 530 that are included in the identified cluster. In further accordance with this example, the difference determination logic 518 compares the scope of the selected permissions, as indicated by the user-initiated token request 544, and the scope of the identified access behavior, as indicated by the behavior information 526, to determine the difference between the scope of the selected permissions and the scope of the identified access behavior. In further accordance with this example, the difference determination logic 518 compares the difference between the scope of the selected permissions and the scope of the identified access behavior to the threshold difference to determine that the difference exceeds the threshold difference. The difference determination logic 518 generates difference information 528 to indicate that the difference between the scope of the selected permissions and the scope of the identified access behavior exceeds the threshold difference. For instance, the difference information may indicate the threshold difference and/or an amount by which the difference between the scope of the selected permissions and the scope of the identified access behavior exceeds the threshold difference. In further accordance with this embodiment, the recommendation that the new access token define the designated permissions (e.g., in lieu of the selected permissions) is provided at step 408 based at least on the user-initiated request and further based at least on the difference between the scope of the selected permissions and the scope of the identified access behavior exceeding the threshold difference. In an example implementation, the recommendation logic 540 provides the permission recommendation 546 based at least on the user-initiated token request 544 and further based at least on the difference information 528 indicating that the difference between the scope of the selected permissions and the scope of the identified access behavior exceeds the threshold difference.

In an aspect of this embodiment, determining that the difference between the scope of the selected permissions and the scope of the identified access behavior exceeds the threshold difference includes determining that an amount by which the scope of the selected permissions exceeds the scope of the identified access behavior is greater than or equal to the threshold difference. In accordance with this embodiment, providing the recommendation at step 408 includes providing the recommendation that the new access token define the designated permissions having the scope that is less than the scope of the selected permissions based at least on the user-initiated request and further based at least on the amount by which the scope of the selected permissions exceeds the scope of the identified access behavior being greater than or equal to the threshold difference.

In another aspect of this embodiment, determining that the difference between the scope of the selected permissions and the scope of the identified access behavior exceeds the threshold difference includes determining that an amount by which the scope of the identified access behavior exceeds the scope of the selected permissions is greater than or equal to the threshold difference. In accordance with this aspect, providing the recommendation at step 408 includes providing the recommendation that the new access token define the designated permissions having the scope that is greater than the scope of the selected permissions based at least on the user-initiated request and further based at least on the amount by which the scope of the identified access behavior exceeds the scope of the selected permissions being greater than or equal to the threshold difference. For instance, providing the recommendation at step 408 may include providing the recommendation that the new access token define the designated permissions having the scope that is greater than the scope of the identified access behavior.

In yet another aspect of this embodiment, determining that the difference between the scope of the selected permissions and the scope of the identified access behavior exceeds the threshold difference includes determining that an amount by which the scope of the identified access behavior exceeds the scope of the selected permissions is greater than or equal to the threshold difference. In accordance with this aspect, providing the recommendation at step 408 includes, based at least on the user-initiated request and further based at least on the amount by which the scope of the identified access behavior exceeds the scope of the selected permissions being greater than or equal to the threshold difference, providing a recommendation to create at least two new access tokens, including the new access token and a second new access token, such that the new access token defines the designated permissions having the scope that is greater than the scope of the selected permissions and such that the second new access token defines the selected permissions. For instance, the new access token may define the designated permissions having the scope that is greater than the scope of the identified access behavior.

In still another aspect of this embodiment, the identified access behavior indicates predicted likelihoods of respective actions to be performed with regard to an arbitrary access request that corresponds to a first requestor type, which corresponds to the identified cluster. In accordance with this aspect, the difference between the scope of the selected permissions and the scope of the identified access behavior takes into consideration the predicted likelihoods of the respective actions to be performed with regard to the arbitrary access request.

In another example embodiment, the method of flowchart 400 further includes receiving a user-initiated authorization message that authorizes configuring the new access token to define the designated permissions. In an example implementation, the token creation logic 542 receives a user-initiated authorization message 548, which authorizes configuring the new access token 550 to define the designated permissions. In accordance with this embodiment, based at least on the user-initiated authorization message, the new access token is created by configuring the new access token to define the designated permissions. In an example implementation, based at least on the user-initiated authorization message 548, the token creation logic 542 creates the new access token 550 by configuring the new access token 550 to define the designated permissions.

In yet another example embodiment, the method of flowchart 400 further includes determining the identified access behavior by analyzing a data plane log that describes accesses of end users to a cloud resource. In an example implementation, the access behavior logic 516 determines the identified access behavior by analyzing the data plane log.

In still another example embodiment, the method of flowchart 400 further includes determining the identified access behavior by analyzing a token management service log that describes administrative operations that are performed using an access token utilized by at least a subset of the access requests. In an example implementation, the access behavior logic 516 determines the identified access behavior by analyzing the token management service log, which describes the administrative operations that are performed using the access token utilized by at least a subset of the access requests 530.

In another example embodiment, the method of flowchart 400 further includes featurizing the attributes of the access requests in the subsets to provide features, which are numerical representations of the attributes. In an example implementation, the featurization logic 512 featurizes the attributes of the access requests 530 in the subsets to provide the features 522, which are numerical representations of the attributes. In accordance with this embodiment, the subsets of the access requests are clustered into the respective clusters at step 402 based at least on the features. For instance, the subsets of the access requests may be clustered into the respective clusters at step 402 based at least on relationships between the features. In an example implementation, the clustering logic 514 clusters the subsets of the access requests 530 into the respective clusters based at least on the features 522.

It will be recognized that the computing system 500 may not include one or more of the cluster-based security logic 508, the featurization logic 512, the clustering logic 514, the access behavior logic 516, the difference determination logic 518, the recommendation logic 540, and/or the token creation logic 542. Furthermore, the computing system 500 may include components in addition to or in lieu of the cluster-based security logic 508, the featurization logic 512, the clustering logic 514, the access behavior logic 516, the difference determination logic 518, the recommendation logic 540, and/or the token creation logic 542.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the cluster-based security logic 108, the cluster-based security logic 308, the featurization logic 312, the clustering logic 314, the access behavior logic 316, the difference determination logic 318, the security action logic 320, the cluster-based security logic 508, the featurization logic 512, the clustering logic 514, the access behavior logic 516, the difference determination logic 518, the recommendation logic 540, the token creation logic 542, flowchart 200, and/or flowchart 400 may be implemented in hardware, software, firmware, or any combination thereof.

For example, any one or more of the cluster-based security logic 108, the cluster-based security logic 308, the featurization logic 312, the clustering logic 314, the access behavior logic 316, the difference determination logic 318, the security action logic 320, the cluster-based security logic 508, the featurization logic 512, the clustering logic 514, the access behavior logic 516, the difference determination logic 518, the recommendation logic 540, the token creation logic 542, flowchart 200, and/or flowchart 400 may be implemented, at least in part, as computer program code configured to be executed in one or more processors.

In another example, any one or more of the cluster-based security logic 108, the cluster-based security logic 308, the featurization logic 312, the clustering logic 314, the access behavior logic 316, the difference determination logic 318, the security action logic 320, the cluster-based security logic 508, the featurization logic 512, the clustering logic 514, the access behavior logic 516, the difference determination logic 518, the recommendation logic 540, the token creation logic 542, flowchart 200, and/or flowchart 400 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 6:
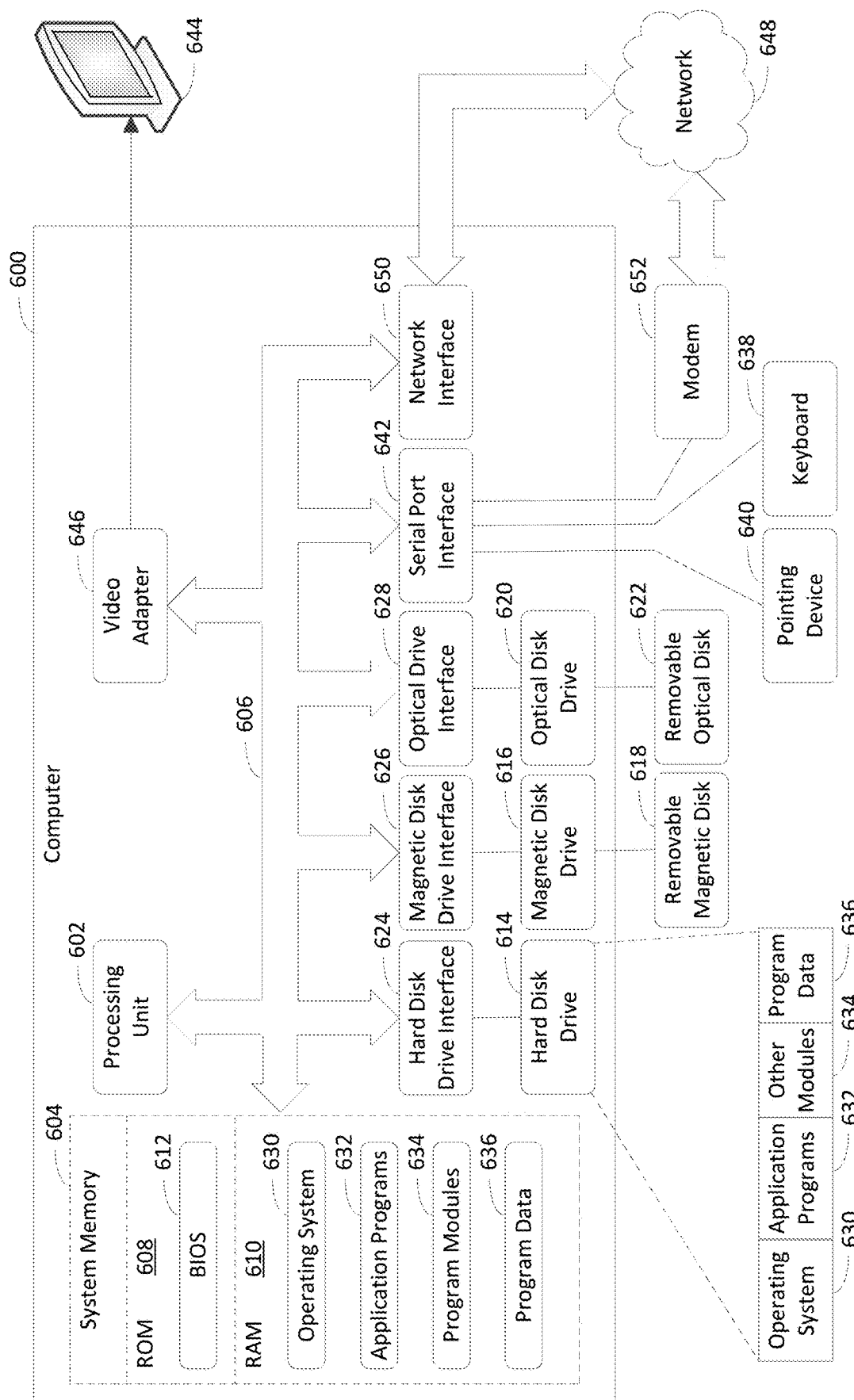
FIG. 6 depicts an example computer in which embodiments may be implemented.

II. Further Discussion of Some Example Embodiments (A1) A first example system (FIG. 1, 102A-102M, 106A-106N; FIG. 3, 300; FIG. 6, 600) comprises memory (FIG. 6, 604, 608, 610) and a processing system (FIG. 6, 602) coupled to the memory. The processing system is configured to cluster (FIG. 2, 202) subsets of access requests (FIG. 3, 330) into respective clusters, which correspond to respective requestor types, based at least on the access requests in the subsets having respective attributes that indicate the respective requestor types. The access requests request access to cloud resources (FIG. 1, 110). The processing system is further configured to identify (FIG. 2, 204) access behaviors that are associated with the access requests in the respective clusters and that correspond to a common access token. The processing system is further configured to determine (FIG. 2, 206) that a difference between a scope of permissions that are defined by the common access token and a scope of a first access behavior, which is associated with a first cluster that corresponds to a first requestor type and which corresponds to the common access token, is greater than or equal to a threshold difference. The processing system is further configured to, based at least on the difference between the scope of the permissions that are defined by the common access token and the scope of the first access behavior being greater than or equal to the threshold difference, perform (FIG. 2, 208) a security action (FIG. 3, 334) with regard to the common access token.

(A2) In the example system of A1, wherein the processing system is configured to: cluster the subsets of the access requests into the respective clusters based at least on the access requests in the subsets being initiated by sources having IP addresses in respective ranges of IP addresses that indicate the respective requestor types.

(A3) In the example system of any of A1-A2, wherein the processing system is configured to: cluster the subsets of the access requests into the respective clusters based at least on the subsets of the access requests having respective referrer attributes that indicate respective intermediate entities that correspond to the respective requestor types.

(A4) In the example system of any of A1-A3, wherein the processing system is configured to: cluster the subsets of the access requests into the respective clusters based at least on the access requests in the subsets being received from user-agents that indicate the respective requestor types.

(A5) In the example system of any of A1-A4, wherein the processing system is configured to: identify the access behaviors that are associated with the access requests in the respective clusters and that correspond to the common access token by analyzing a data plane log that describes accesses of end users to a cloud resource that use the common access token.

(A6) In the example system of any of A1-A5, wherein the processing system is configured to: identify the access behaviors that are associated with the access requests in the respective clusters and that correspond to the common access token by analyzing a token management service log that describes administrative operations that are performed using the common access token.

(A7) In the example system of any of A1-A6, wherein the processing system is configured to: perform the security action by generating a security alert, which indicates the difference between the scope of the permissions that are defined by the common access token and the scope of the first access behavior.

(A8) In the example system of any of A1-A7, wherein the processing system is configured to: determine that an amount by which the scope of the permissions that are defined by the common access token exceeds the scope of the first access behavior, which is associated with the first cluster and which corresponds to the common access token, is greater than or equal to the threshold difference; and based at least on the amount by which the scope of the permissions that are defined by the common access token exceeds the scope of the first access behavior being greater than or equal to the threshold difference, perform the security operation by providing a recommendation to reduce the scope of the permissions that are defined by the common access token.

(A9) In the example system of any of A1-A8, wherein the processing system is configured to: determine that an amount by which the scope of the first access behavior, which is associated with the first cluster and which corresponds to the common access token, exceeds the scope of the permissions that are defined by the common access token is greater than or equal to the threshold difference; and based at least on the amount by which the scope of the first access behavior exceeds the scope of the permissions that are defined by the common access token being greater than or equal to the threshold difference, perform the security action by providing a recommendation to increase the scope of the permissions that are defined by the common access token.

(A10) In the example system of any of A1-A9, wherein the processing system is configured to: determine that an amount by which the scope of the first access behavior, which is associated with the first cluster and which corresponds to the common access token, exceeds the scope of the permissions that are defined by the common access token is greater than or equal to the threshold difference; and based at least on the amount by which the scope of the first access behavior exceeds the scope of the permissions that are defined by the common access token being greater than or equal to the threshold difference, perform the security action by providing a recommendation to replace the common access token with multiple access tokens that define respective sets of permissions that have respective different scopes.

(A11) In the example system of any of A1-A10, wherein the processing system is configured to: featurize the attributes of the access requests in the subsets to provide features, which are numerical representations of the attributes; and cluster the subsets of the access requests into the respective clusters based at least on the features.

(A12) In the example system of any of A1-A11, wherein the first access behavior indicates predicted likelihoods of respective actions to be performed with regard to an arbitrary access request that corresponds to the first requestor type and that uses the common access token; and wherein the difference between the scope of the permissions that are defined by the common access token and the scope of the first access behavior takes into consideration the predicted likelihoods of the respective actions to be performed with regard to the arbitrary access request.

(B1) A second example system (FIG. 1, 102A-102M, 106A-106N; FIG. 5, 500; FIG. 6, 600) comprises memory (FIG. 6, 604, 608, 610) and a processing system (FIG. 6, 602) coupled to the memory. The processing system is configured to cluster (FIG. 4, 402) subsets of access requests (FIG. 5, 530) into respective clusters, which correspond to respective requestor types, based at least on the access requests in the subsets having respective attributes that indicate the respective requestor types. The access requests request access to cloud resources (FIG. 1, 110). The processing system is further configured to receive (FIG. 4, 406) a user-initiated request (FIG. 5, 544) to create a new access token (FIG. 5, 550). The processing system is further configured to, based at least on the user-initiated request, provide (FIG. 4, 408) a recommendation (FIG. 5, 546) that the new access token define designated permissions as a result of the designated permissions having a scope that is based at least on a scope of an identified access behavior associated with the access requests that are included in an identified cluster of the access requests.

(B2) In the example system of B1, wherein the processing system is configured to: receive the user-initiated request, which requests that the new access token define selected permissions; determine that a difference between a scope of the selected permissions and the scope of the identified access behavior associated with the access requests that are included in the identified cluster exceeds a threshold difference; and based at least on the user-initiated request and further based at least on the difference between the scope of the selected permissions and the scope of the identified access behavior exceeding the threshold difference, provide the recommendation that the new access token define the designated permissions.

(B3) In the example system of any of B1-B2, wherein the processing system is configured to: determine that an amount by which the scope of the selected permissions exceeds the scope of the identified access behavior, which is associated with the access requests that are included in the identified cluster, is greater than or equal to the threshold difference; and based at least on the user-initiated request and further based at least on the amount by which the scope of the selected permissions exceeds the scope of the identified access behavior being greater than or equal to the threshold difference, provide the recommendation that the new access token define the designated permissions having the scope that is less than the scope of the selected permissions.

(B4) In the example system of any of B1-B3, wherein the processing system is configured to: determine that an amount by which the scope of the identified access behavior, which is associated with the access requests that are included in the identified cluster, exceeds the scope of the selected permissions is greater than or equal to the threshold difference; and based at least on the user-initiated request and further based at least on the amount by which the scope of the identified access behavior exceeds the scope of the selected permissions being greater than or equal to the threshold difference, provide the recommendation that the new access token define the designated permissions having the scope that is greater than the scope of the selected permissions.

(B5) In the example system of any of B1-B4, wherein the processing system is configured to: determine that an amount by which the scope of the identified access behavior, which is associated with the access requests that are included in the identified cluster, exceeds the scope of the selected permissions is greater than or equal to the threshold difference; and based at least on the user-initiated request and further based at least on the amount by which the scope of the identified access behavior exceeds the scope of the selected permissions being greater than or equal to the threshold difference, provide a recommendation to create at least two new access tokens, including the new access token and a second new access token, such that the new access token defines the designated permissions having the scope that is greater than the scope of the selected permissions and such that the second new access token defines the selected permissions.

(B6) In the example system of any of B1-B5, wherein the identified access behavior indicates predicted likelihoods of respective actions to be performed with regard to an arbitrary access request that corresponds to a first requestor type, which corresponds to the identified cluster; and wherein the difference between the scope of the selected permissions and the scope of the identified access behavior takes into consideration the predicted likelihoods of the respective actions to be performed with regard to the arbitrary access request.

(B7) In the example system of any of B1-B6, wherein the processing system is further configured to: receive a user-initiated authorization message that authorizes configuring the new access token to define the designated permissions; and based at least on the user-initiated authorization message, create the new access token by configuring the new access token to define the designated permissions.

(B8) In the example system of any of B1-B7, wherein the processing system is configured to: cluster the subsets of the access requests into the respective clusters based at least on the access requests in the subsets being initiated by sources having IP addresses in respective ranges of IP addresses that indicate the respective requestor types.

(B9) In the example system of any of B1-B8, wherein the processing system is configured to: cluster the subsets of the access requests into the respective clusters based at least on the subsets of the access requests having respective referrer attributes that indicate respective intermediate entities that correspond to the respective requestor types.

(B10) In the example system of any of B1-B9, wherein the processing system is configured to: cluster the subsets of the access requests into the respective clusters based at least on the access requests in the subsets being received from user-agents that indicate the respective requestor types.

(B11) In the example system of any of B1-B10, wherein the processing system is further configured to: determine the identified access behavior by analyzing a data plane log that describes accesses of end users to a cloud resource.

(B12) In the example system of any of B1-B11, wherein the processing system is further configured to: determine the identified access behavior by analyzing a token management service log that describes administrative operations that are performed using an access token utilized by at least a subset of the access requests.

(B13) In the example system of any of B1-B12, wherein the processing system is configured to: featurize the attributes of the access requests in the subsets to provide features, which are numerical representations of the attributes; and cluster the subsets of the access requests into the respective clusters based at least on the features.

(C1) A first example method is implemented by a computing system (FIG. 1, 102A-102M, 106A-106N; FIG. 3, 300; FIG. 6, 600). The method comprises clustering (FIG. 2, 202) subsets of access requests (FIG. 3, 330) into respective clusters, which correspond to respective requestor types, based at least on the access requests in the subsets having respective attributes that indicate the respective requestor types. The access requests request access to cloud resources (FIG. 1, 110). The method further comprises identifying (FIG. 2, 204) access behaviors that are associated with the access requests in the respective clusters and that correspond to a common access token. The method further comprises determining (FIG. 2, 206) that a difference between a scope of permissions that are defined by the common access token and a scope of a first access behavior, which is associated with a first cluster that corresponds to a first requestor type and which corresponds to the common access token, is greater than or equal to a threshold difference. The method further comprises, based at least on the difference between the scope of the permissions that are defined by the common access token and the scope of the first access behavior being greater than or equal to the threshold difference, performing (FIG. 2, 208) a security action (FIG. 3, 334) with regard to the common access token.

(C2) In the method of C1, wherein clustering the subsets of the access requests into the respective clusters comprises: clustering the subsets of the access requests into the respective clusters based at least on the access requests in the subsets being initiated by sources having IP addresses in respective ranges of IP addresses that indicate the respective requestor types.

(C3) In the method of any of C1-C2, wherein clustering the subsets of the access requests into the respective clusters comprises: clustering the subsets of the access requests into the respective clusters based at least on the subsets of the access requests having respective referrer attributes that indicate respective intermediate entities that correspond to the respective requestor types.

(C4) In the method of any of C1-C3, wherein clustering the subsets of the access requests into the respective clusters comprises: clustering the subsets of the access requests into the respective clusters based at least on the access requests in the subsets being received from user-agents that indicate the respective requestor types.

(C5) In the method of any of C1-C4, wherein identifying the access behaviors comprises: identifying the access behaviors that are associated with the access requests in the respective clusters and that correspond to the common access token by analyzing a data plane log that describes accesses of end users to a cloud resource that use the common access token.

(C6) In the method of any of C1-C5, wherein identifying the access behaviors comprises: identifying the access behaviors that are associated with the access requests in the respective clusters and that correspond to the common access token by analyzing a token management service log that describes administrative operations that are performed using the common access token.

(C7) In the method of any of C1-C6, wherein performing the security action comprises: generating a security alert, which indicates the difference between the scope of the permissions that are defined by the common access token and the scope of the first access behavior.

(C8) In the method of any of C1-C7, wherein determining that the difference between the scope of the permissions that are defined by the common access token and the scope of the first access behavior is greater than or equal to the threshold difference comprises: determining that an amount by which the scope of the permissions that are defined by the common access token exceeds the scope of the first access behavior, which is associated with the first cluster and which corresponds to the common access token, is greater than or equal to the threshold difference; and wherein performing the security action comprises: based at least on the amount by which the scope of the permissions that are defined by the common access token exceeds the scope of the first access behavior being greater than or equal to the threshold difference, providing a recommendation to reduce the scope of the permissions that are defined by the common access token.

(C9) In the method of any of C1-C8, wherein determining that the difference between the scope of the permissions that are defined by the common access token and the scope of the first access behavior is greater than or equal to the threshold difference comprises: determining that an amount by which the scope of the first access behavior, which is associated with the first cluster and which corresponds to the common access token, exceeds the scope of the permissions that are defined by the common access token is greater than or equal to the threshold difference; and wherein performing the security action comprises: based at least on the amount by which the scope of the first access behavior exceeds the scope of the permissions that are defined by the common access token being greater than or equal to the threshold difference, providing a recommendation to increase the scope of the permissions that are defined by the common access token.

(C10) In the method of any of C1-C9, wherein determining that the difference between the scope of the permissions that are defined by the common access token and the scope of the first access behavior is greater than or equal to the threshold difference comprises: determining that an amount by which the scope of the first access behavior, which is associated with the first cluster and which corresponds to the common access token, exceeds the scope of the permissions that are defined by the common access token is greater than or equal to the threshold difference; and wherein performing the security action comprises: based at least on the amount by which the scope of the first access behavior exceeds the scope of the permissions that are defined by the common access token being greater than or equal to the threshold difference, providing a recommendation to replace the common access token with multiple access tokens that define respective sets of permissions that have respective different scopes.

(C11) In the method of any of C1-C10, further comprising: featurizing the attributes of the access requests in the subsets to provide features, which are numerical representations of the attributes; wherein clustering the subsets of the access requests comprises: clustering the subsets of the access requests into the respective clusters based at least on the features.

(C12) In the method of any of C1-C11, wherein the first access behavior indicates predicted likelihoods of respective actions to be performed with regard to an arbitrary access request that corresponds to the first requestor type and that uses the common access token; and wherein the difference between the scope of the permissions that are defined by the common access token and the scope of the first access behavior takes into consideration the predicted likelihoods of the respective actions to be performed with regard to the arbitrary access request.

(D1) A second example method is implemented by a computing system (FIG. 1, 102A-102M, 106A-106N; FIG. 5, 500; FIG. 6, 600). The method comprises clustering (FIG. 4, 402) subsets of access requests (FIG. 5, 530) into respective clusters, which correspond to respective requestor types, based at least on the access requests in the subsets having respective attributes that indicate the respective requestor types. The access requests request access to cloud resources (FIG. 1, 110). The method further comprises receiving (FIG. 4, 406) a user-initiated request (FIG. 5, 544) to create a new access token (FIG. 5, 550). The method further comprises, based at least on the user-initiated request, providing (FIG. 4, 408) a recommendation (FIG. 5, 546) that the new access token define designated permissions as a result of the designated permissions having a scope that is based at least on a scope of an identified access behavior associated with the access requests that are included in an identified cluster of the access requests.

(D2) In the method of D1, wherein receiving the user-initiated request comprises: receiving the user-initiated request, which requests that the new access token define selected permissions; wherein the method further comprises: determining that a difference between a scope of the selected permissions and the scope of the identified access behavior associated with the access requests that are included in the identified cluster exceeds a threshold difference; and wherein providing the recommendation comprises: based at least on the user-initiated request and further based at least on the difference between the scope of the selected permissions and the scope of the identified access behavior exceeding the threshold difference, providing the recommendation that the new access token define the designated permissions.

(D3) In the method of any of D1-D2, wherein determining that the difference between the scope of the selected permissions and the scope of the identified access behavior associated with the access requests that are included in the identified cluster exceeds the threshold difference comprises: determining that an amount by which the scope of the selected permissions exceeds the scope of the identified access behavior, which is associated with the access requests that are included in the identified cluster, is greater than or equal to the threshold difference; and wherein providing the recommendation comprises: based at least on the user-initiated request and further based at least on the amount by which the scope of the selected permissions exceeds the scope of the identified access behavior being greater than or equal to the threshold difference, providing the recommendation that the new access token define the designated permissions having the scope that is less than the scope of the selected permissions.

(D4) In the method of any of D1-D3, wherein determining that the difference between the scope of the selected permissions and the scope of the identified access behavior associated with the access requests that are included in the identified cluster exceeds the threshold difference comprises: determining that an amount by which the scope of the identified access behavior, which is associated with the access requests that are included in the identified cluster, exceeds the scope of the selected permissions is greater than or equal to the threshold difference; and wherein providing the recommendation comprises: based at least on the user-initiated request and further based at least on the amount by which the scope of the identified access behavior exceeds the scope of the selected permissions being greater than or equal to the threshold difference, providing the recommendation that the new access token define the designated permissions having the scope that is greater than the scope of the selected permissions.

(D5) In the method of any of D1-D4, wherein determining that the difference between the scope of the selected permissions and the scope of the identified access behavior associated with the access requests that are included in the identified cluster exceeds the threshold difference comprises: determining that an amount by which the scope of the identified access behavior, which is associated with the access requests that are included in the identified cluster, exceeds the scope of the selected permissions is greater than or equal to the threshold difference; and wherein providing the recommendation comprises: based at least on the user-initiated request and further based at least on the amount by which the scope of the identified access behavior exceeds the scope of the selected permissions being greater than or equal to the threshold difference, providing a recommendation to create at least two new access tokens, including the new access token and a second new access token, such that the new access token defines the designated permissions having the scope that is greater than the scope of the selected permissions and such that the second new access token defines the selected permissions.

(D6) In the method of any of D1-D5, wherein the identified access behavior indicates predicted likelihoods of respective actions to be performed with regard to an arbitrary access request that corresponds to a first requestor type, which corresponds to the identified cluster; and wherein the difference between the scope of the selected permissions and the scope of the identified access behavior takes into consideration the predicted likelihoods of the respective actions to be performed with regard to the arbitrary access request.

(D7) In the method of any of D1-D6, further comprising: receiving a user-initiated authorization message that authorizes configuring the new access token to define the designated permissions; and based at least on the user-initiated authorization message, creating the new access token by configuring the new access token to define the designated permissions.

(D8) In the method of any of D1-D7, wherein clustering the subsets of the access requests into the respective clusters comprises: clustering the subsets of the access requests into the respective clusters based at least on the access requests in the subsets being initiated by sources having IP addresses in respective ranges of IP addresses that indicate the respective requestor types.

(D9) In the method of any of D1-D8, wherein clustering the subsets of the access requests into the respective clusters comprises: clustering the subsets of the access requests into the respective clusters based at least on the subsets of the access requests having respective referrer attributes that indicate respective intermediate entities that correspond to the respective requestor types.

(D10) In the method of any of D1-D9, wherein clustering the subsets of the access requests into the respective clusters comprises: clustering the subsets of the access requests into the respective clusters based at least on the access requests in the subsets being received from user-agents that indicate the respective requestor types.

(D11) In the method of any of D1-D10, further comprising: determining the identified access behavior by analyzing a data plane log that describes accesses of end users to a cloud resource.

(D12) In the method of any of D1-D11, further comprising: determining the identified access behavior by analyzing a token management service log that describes administrative operations that are performed using an access token utilized by at least a subset of the access requests.

(D13) In the method of any of D1-D12, further comprising: featurizing the attributes of the access requests in the subsets to provide features, which are numerical representations of the attributes; wherein clustering the subsets of the access requests comprises: clustering the subsets of the access requests into the respective clusters based at least on the features.

(E1) A first example computer program product (FIG. 6, 618, 622) comprising a computer-readable storage medium having instructions recorded thereon for enabling a processor-based system (FIG. 1, 102A-102M, 106A-106N; FIG. 3, 300; FIG. 6, 600) to perform operations. The operations comprise clustering (FIG. 2, 202) subsets of access requests (FIG. 3, 330) into respective clusters, which correspond to respective requestor types, based at least on the access requests in the subsets having respective attributes that indicate the respective requestor types. The access requests request access to cloud resources (FIG. 1, 110). The operations further comprise identifying (FIG. 2, 204) access behaviors that are associated with the access requests in the respective clusters and that correspond to a common access token. The operations further comprise determining (FIG. 2, 206) that a difference between a scope of permissions that are defined by the common access token and a scope of a first access behavior, which is associated with a first cluster that corresponds to a first requestor type and which corresponds to the common access token, is greater than or equal to a threshold difference. The operations further comprise, based at least on the difference between the scope of the permissions that are defined by the common access token and the scope of the first access behavior being greater than or equal to the threshold difference, performing (FIG. 2, 208) a security action (FIG. 3, 334) with regard to the common access token.

(F1) A second example computer program product (FIG. 6, 618, 622) comprising a computer-readable storage medium having instructions recorded thereon for enabling a processor-based system (FIG. 1, 102A-102M, 106A-106N; FIG. 5, 500; FIG. 6, 600) to perform operations. The operations comprise clustering (FIG. 4, 402) subsets of access requests (FIG. 5, 530) into respective clusters, which correspond to respective requestor types, based at least on the access requests in the subsets having respective attributes that indicate the respective requestor types. The access requests request access to cloud resources (FIG. 1, 110). The operations further comprise receiving (FIG. 4, 406) a user-initiated request (FIG. 5, 544) to create a new access token (FIG. 5, 550). The operations further comprise, based at least on the user-initiated request, providing (FIG. 4, 408) a recommendation (FIG. 5, 546) that the new access token define designated permissions as a result of the designated permissions having a scope that is based at least on a scope of an identified access behavior associated with the access requests that are included in an identified cluster of the access requests.

III. Example Computer System

FIG. 6 depicts an example computer 600 in which embodiments may be implemented. Any one or more of the user devices 102A-102M and/or any one or more of the servers 106A-106N shown in FIG. 1; computing system 300 shown in FIG. 3; and/or computing system 500 shown in FIG. 5 may be implemented using computer 600, including one or more features of computer 600 and/or alternative features. Computer 600 may be a general-purpose computing device in the form of a conventional personal computer, a mobile computer, or a workstation, for example, or computer 600 may be a special purpose computing device. The description of computer 600 provided herein is provided for purposes of illustration, and is not intended to be limiting. Embodiments may be implemented in further types of computer systems, as would be known to persons skilled in the relevant art(s).

As shown in FIG. 6, computer 600 includes a processing unit 602, a system memory 604, and a bus 606 that couples various system components including system memory 604 to processing unit 602. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

Computer 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk. ROM, or RAM. These programs include an operating system 630, one or more application programs 632, other program modules 634, and program data 636. Application programs 632 or program modules 634 may include, for example, computer program logic for implementing any one or more of (e.g., at least a portion of) the cluster-based security logic 108, the cluster-based security logic 308, the featurization logic 312, the clustering logic 314, the access behavior logic 316, the difference determination logic 318, the security action logic 320, the cluster-based security logic 508, the featurization logic 512, the clustering logic 514, the access behavior logic 516, the difference determination logic 518, the recommendation logic 540, the token creation logic 542, flowchart 200 (including any step of flowchart 200), and/or flowchart 400 (including any step of flowchart 400), as described herein.

A user may enter commands and information into the computer 600 through input devices such as keyboard 638 and pointing device 640. Other input devices (not shown) may include a microphone, joystick, game pad, satellite dish, scanner, touch screen, camera, accelerometer, gyroscope, or the like. These and other input devices are often connected to the processing unit 602 through a serial port interface 642 that is coupled to bus 606, but may be connected by other interfaces, such as a parallel port, game port, or a universal serial bus (USB).

A display device 644 (e.g., a monitor) is also connected to bus 606 via an interface, such as a video adapter 646. In addition to display device 644, computer 600 may include other peripheral output devices (not shown) such as speakers and printers.

Computer 600 is connected to a network 648 (e.g., the Internet) through a network interface or adapter 650, a modem 652, or other means for establishing communications over the network. Modem 652, which may be internal or external, is connected to bus 606 via serial port interface 642.

As used herein, the terms "computer program medium" and "computer-readable storage medium" are used to generally refer to media (e.g., non-transitory media) such as the hard disk associated with hard disk drive 614, removable magnetic disk 618, removable optical disk 622, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 632 and other program modules 634) may be stored on the hard disk, magnetic disk, optical disk, ROM, or RAM. Such computer programs may also be received via network interface 650 or serial port interface 642. Such computer programs, when executed or loaded by an application, enable computer 600 to implement features of embodiments discussed herein. Accordingly, such computer programs represent controllers of the computer 600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   memory; and
   a processing system coupled to the memory, the processing system configured to:
      cluster subsets of access requests into respective clusters, which correspond to respective requestor types, based at least on the access requests in the subsets having respective attributes that indicate the respective requestor types, the access requests requesting access to cloud resources;
      identify access behaviors that are associated with the access requests in the respective clusters and that correspond to a common access token;
      determine that a difference between a scope of permissions that are defined by the common access token and a scope of a first access behavior, which is associated with a first cluster that corresponds to a first requestor type and which corresponds to the common access token, is greater than or equal to a threshold difference; and
      based at least on the difference between the scope of the permissions that are defined by the common access token and the scope of the first access behavior being greater than or equal to the threshold difference, perform a security action with regard to the common access token.

2. The system of claim 1, wherein the processing system is configured to:
   cluster the subsets of the access requests into the respective clusters based at least on:
      the access requests in the subsets being initiated by sources having internet protocol (IP) addresses in respective ranges of IP addresses that indicate the respective requestor types;
      the subsets of the access requests having respective referrer attributes that indicate respective intermediate entities that correspond to the respective requestor types; or
      the access requests in the subsets being received from user-agents that indicate the respective requestor types.

3. The system of claim 1, wherein the processing system is configured to:
   identify the access behaviors that are associated with the access requests in the respective clusters and that correspond to the common access token by analyzing at least one of the following:
      a data plane log that describes accesses of end users to a cloud resource that use the common access token;
      a token management service log that describes administrative operations that are performed using the common access token.

4. The system of claim 1, wherein the processing system is configured to:
   perform the security action by generating a security alert, which indicates the difference between the scope of the permissions that are defined by the common access token and the scope of the first access behavior.

5. The system of claim 1, wherein the processing system is configured to:
   determine that an amount by which the scope of the permissions that are defined by the common access token exceeds the scope of the first access behavior, which is associated with the first cluster and which corresponds to the common access token, is greater than or equal to the threshold difference; and
   based at least on the amount by which the scope of the permissions that are defined by the common access token exceeds the scope of the first access behavior being greater than or equal to the threshold difference, perform the security operation by providing a recommendation to reduce the scope of the permissions that are defined by the common access token.

6. The system of claim 1, wherein the processing system is configured to:
   determine that an amount by which the scope of the first access behavior, which is associated with the first cluster and which corresponds to the common access token, exceeds the scope of the permissions that are defined by the common access token is greater than or equal to the threshold difference; and
   based at least on the amount by which the scope of the first access behavior exceeds the scope of the permissions that are defined by the common access token being greater than or equal to the threshold difference, perform the security action by providing a recommendation to increase the scope of the permissions that are defined by the common access token.

7. The system of claim 1, wherein the processing system is configured to:
   determine that an amount by which the scope of the first access behavior, which is associated with the first cluster and which corresponds to the common access token, exceeds the scope of the permissions that are defined by the common access token is greater than or equal to the threshold difference; and
   based at least on the amount by which the scope of the first access behavior exceeds the scope of the permissions that are defined by the common access token being greater than or equal to the threshold difference, perform the security action by providing a recommendation to replace the common access token with multiple access tokens that define respective sets of permissions that have respective different scopes.

8. The system of claim 1, wherein the processing system is configured to:
   featurize the attributes of the access requests in the subsets to provide features, which are numerical representations of the attributes; and
   cluster the subsets of the access requests into the respective clusters based at least on the features.

9. The system of claim 1, wherein the first access behavior indicates predicted likelihoods of respective actions to be performed with regard to an arbitrary access request that corresponds to the first requestor type and that uses the common access token; and
   wherein the difference between the scope of the permissions that are defined by the common access token and the scope of the first access behavior takes into consideration the predicted likelihoods of the respective actions to be performed with regard to the arbitrary access request.

10. A method implemented by a computing system, the method comprising:
    clustering subsets of access requests into respective clusters, which correspond to respective requestor types, based at least on the access requests in the subsets having respective attributes that indicate the respective requestor types, the access requests requesting access to cloud resources;

receiving a user-initiated request to create a new access token, the user-initiated request requesting that the new access token define selected permissions;

determining that a difference between a scope of the selected permissions and a scope of an identified access behavior associated with the access requests that are included in an identified cluster exceeds a threshold difference; and based at least on the user-initiated request and the difference between the scope of the selected permissions and the scope of the identified access behavior exceeding the threshold difference, providing a recommendation that the new access token define designated permissions as a result of the designated permissions having a scope that is based at least on the scope of the identified access behavior.

11. The method of claim 10, wherein determining that the difference between the scope of the selected permissions and the scope of the identified access behavior associated with the access requests that are included in the identified cluster exceeds the threshold difference comprises:

determining that an amount by which the scope of the selected permissions exceeds the scope of the identified access behavior, which is associated with the access requests that are included in the identified cluster, is greater than or equal to the threshold difference; and wherein providing the recommendation comprises:

based at least on the user-initiated request and further based at least on the amount by which the scope of the selected permissions exceeds the scope of the identified access behavior being greater than or equal to the threshold difference, providing the recommendation that the new access token define the designated permissions having the scope that is less than the scope of the selected permissions.

12. The method of claim 10, wherein determining that the difference between the scope of the selected permissions and the scope of the identified access behavior associated with the access requests that are included in the identified cluster exceeds the threshold difference comprises:

determining that an amount by which the scope of the identified access behavior, which is associated with the access requests that are included in the identified cluster, exceeds the scope of the selected permissions is greater than or equal to the threshold difference; and wherein providing the recommendation comprises:

based at least on the user-initiated request and further based at least on the amount by which the scope of the identified access behavior exceeds the scope of the selected permissions being greater than or equal to the threshold difference, providing the recommendation that the new access token define the designated permissions having the scope that is greater than the scope of the selected permissions.

13. The method of claim 10, wherein determining that the difference between the scope of the selected permissions and the scope of the identified access behavior associated with the access requests that are included in the identified cluster exceeds the threshold difference comprises:

determining that an amount by which the scope of the identified access behavior, which is associated with the access requests that are included in the identified cluster, exceeds the scope of the selected permissions is greater than or equal to the threshold difference; and wherein providing the recommendation comprises:

based at least on the user-initiated request and further based at least on the amount by which the scope of the identified access behavior exceeds the scope of the selected permissions being greater than or equal to the threshold difference, providing a recommendation to create at least two new access tokens, including the new access token and a second new access token, such that the new access token defines the designated permissions having the scope that is greater than the scope of the selected permissions and such that the second new access token defines the selected permissions.

14. The method of claim 10, wherein the identified access behavior indicates predicted likelihoods of respective actions to be performed with regard to an arbitrary access request that corresponds to a first requestor type, which corresponds to the identified cluster; and wherein the difference between the scope of the selected permissions and the scope of the identified access behavior takes into consideration the predicted likelihoods of the respective actions to be performed with regard to the arbitrary access request.

15. The method of claim 10, further comprising:

receiving a user-initiated authorization message that authorizes configuring the new access token to define the designated permissions; and based at least on the user-initiated authorization message, creating the new access token by configuring the new access token to define the designated permissions.

16. The method of claim 10, wherein clustering the subsets of the access requests into the respective clusters comprises:

clustering the subsets of the access requests into the respective clusters based at least on:

the access requests in the subsets being initiated by sources having IP addresses in respective ranges of internet protocol (IP) addresses that indicate the respective requestor types;

the subsets of the access requests having respective referrer attributes that indicate respective intermediate entities that correspond to the respective requestor types; or the access requests in the subsets being received from user-agents that indicate the respective requestor types.

17. The method of claim 10, further comprising:

determining the identified access behavior by analyzing at least one of the following:

a data plane log that describes accesses of end users to a cloud resource;

a token management service log that describes administrative operations that are performed using an access token utilized by at least a subset of the access requests.

18. The method of claim 10, further comprising:

featurizing the attributes of the access requests in the subsets to provide features, which are numerical representations of the attributes;

wherein clustering the subsets of the access requests comprises:

clustering the subsets of the access requests into the respective clusters based at least on the features.

19. A computer program product comprising a computer-readable storage medium having instructions recorded thereon for enabling a processor-based system to perform operations, the operations comprising:

clustering subsets of access requests into respective clusters, which correspond to respective requestor types, based at least on the access requests in the subsets having respective attributes that indicate the respective requestor types, the access requests requesting access to cloud resources;

receiving a user-initiated request to create a new access token;

based at least on the user-initiated request, providing a recommendation that the new access token define designated permissions as a result of the designated permissions having a scope that is based at least on a scope of an identified access behavior associated with the access requests that are included in an identified cluster of the access requests;

receiving a user-initiated authorization message that authorizes configuring the new access token to define the designated permissions; and based at least on the user-initiated authorization message, creating the new access token by configuring the new access token to define the designated permissions.

20. The method of claim 10, further comprising:

determining the identified access behavior based at least on frequencies with which access actions are requested by the access requests in the identified cluster over a specified period of time.

\* \* \* \* \*